(12) United States Patent
Miyata et al.

(10) Patent No.: US 10,074,322 B2
(45) Date of Patent: Sep. 11, 2018

(54) LIQUID CRYSTAL DISPLAY DEVICE AND METHOD OF DRIVING SAME

(71) Applicant: Sharp Kabushiki Kaisha, Sakai, Osaka (JP)

(72) Inventors: Hidekazu Miyata, Sakai (JP); Masafumi Yashiki, Sakai (JP); Takenobu Nishiguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/509,887

(22) PCT Filed: Jul. 3, 2015

(86) PCT No.: PCT/JP2015/069260
§ 371 (c)(1),
(2) Date: Mar. 9, 2017

(87) PCT Pub. No.: WO2016/042885
PCT Pub. Date: Mar. 24, 2016

(65) Prior Publication Data
US 2017/0256211 A1    Sep. 7, 2017

(30) Foreign Application Priority Data

Sep. 16, 2014 (JP) .................................. 2014-188106

(51) Int. Cl.
*G09G 3/36* (2006.01)
*G09G 3/34* (2006.01)
*G02F 1/1335* (2006.01)

(52) U.S. Cl.
CPC ......... *G09G 3/3607* (2013.01); *G09G 3/3406* (2013.01); *G09G 3/3618* (2013.01); *G02F 2001/133622* (2013.01); *G02F 2203/30* (2013.01); *G09G 2310/0235* (2013.01); *G09G 2310/0251* (2013.01); *G09G 2320/0247* (2013.01); *G09G 2320/0252* (2013.01); *G09G 2320/0666* (2013.01)

(Continued)

(58) Field of Classification Search
CPC ............... G09G 3/3607; G09G 3/3618; G09G 2320/0247; G09G 2320/0266
See application file for complete search history.

(56) References Cited

U.S. PATENT DOCUMENTS 6,492,969 B1    12/2002 Budzelaar
2016/0104444 A1*  4/2016 Miyata ................. G09G 3/3406
                                                            345/205

FOREIGN PATENT DOCUMENTS

JP          7-121138 A      5/1995
JP        2003-502687 A     1/2003
WO       2010/084619 A1     7/2010

* cited by examiner

*Primary Examiner* — Liliana Cerullo
(74) *Attorney, Agent, or Firm* — Keating & Bennett, LLP

(57) ABSTRACT

An object of the present invention is to realize a liquid crystal display device of a field sequential system which is capable of preventing occurrence of color shift and flicker. One frame period is divided into a plurality of fields, the number of which is greater than the number of lighting patterns. Provided are a liquid crystal state value acquiring unit (131) configured to obtain a liquid crystal state value at an end time of a display field based on an input gradation value in the display field and a liquid crystal state value at an end time of a previous field (one field before the display field) (a gradation value corresponding to an aligned state of liquid crystal molecules), and an application gradation value acquiring unit (133) configured to obtain an application gradation value in the display field by correcting an input gradation value in the display field based on a liquid crystal state value at the end time of the previous field. The application gradation value acquiring unit (133) obtains an application gradation value such that display luminance in each field becomes display luminance corresponding to the input gradation value.

13 Claims, 37 Drawing Sheets

Fig.8
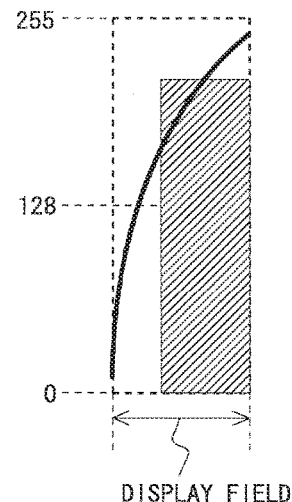
WHEN LIQUID CRYSTAL STATE VALUE AT END TIME OF PREVIOUS FIELD IS RELATIVELY LOW
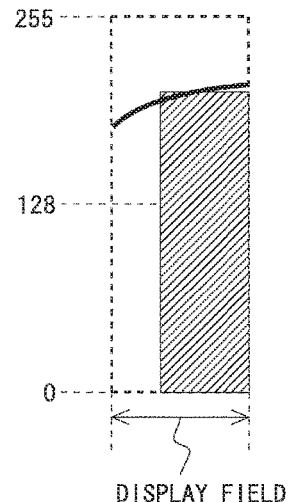
WHEN LIQUID CRYSTAL STATE VALUE AT END TIME OF PREVIOUS FIELD IS RELATIVELY HIGH
Fig.9
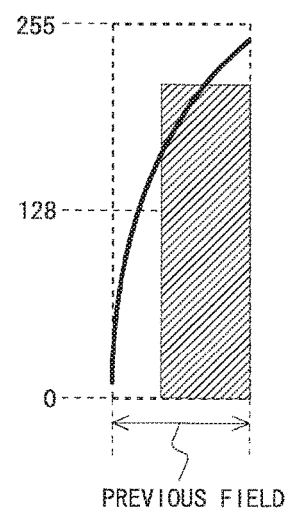
WHEN LIQUID CRYSTAL STATE VALUE AT END TIME OF FIELD THAT IS TWO FIELDS BEFORE IS RELATIVELY LOW
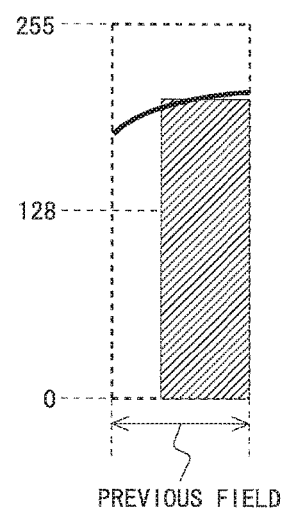
WHEN LIQUID CRYSTAL STATE VALUE AT END TIME OF FIELD THAT IS TWO FIELDS BEFORE IS RELATIVELY HIGH

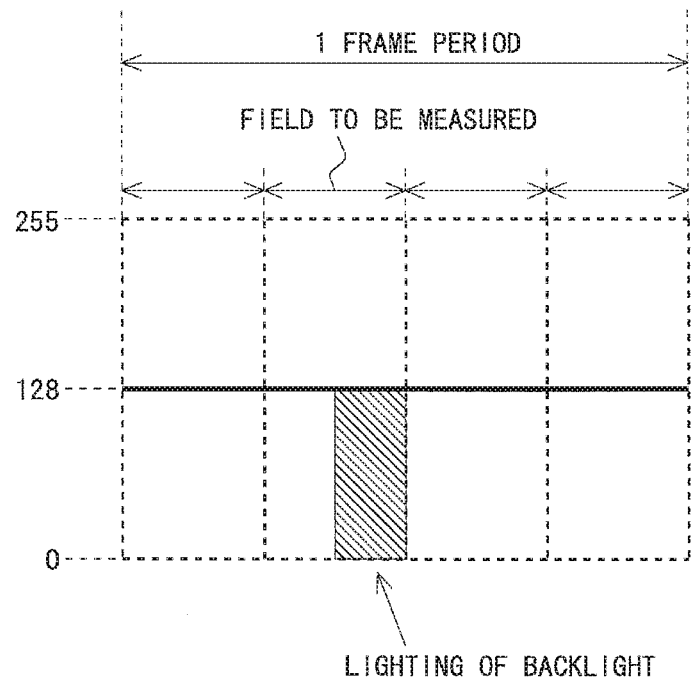

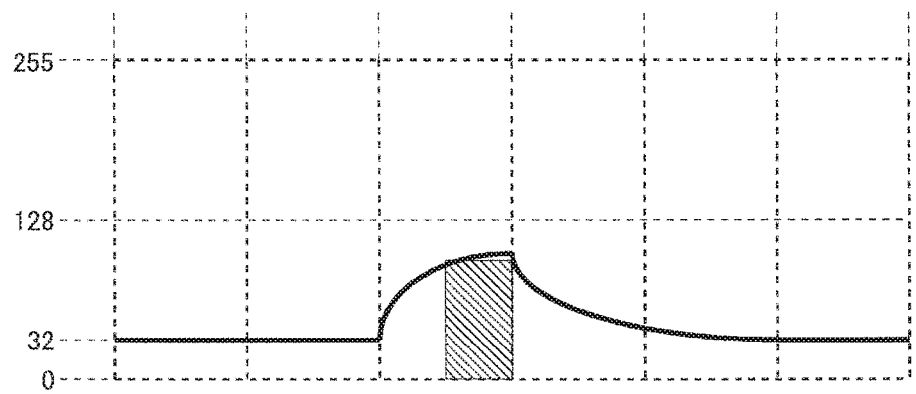

| GRADATION VALUE (8bit) | LUMINANCE VALUE (cd/m²) |
|---|---|
| ⋮ | ⋮ |
| 128 | 8.734 |
| ⋮ | ⋮ |
| 238 | 16.308 | ←—81
| ⋮ | ⋮ |
| 254 | 73.770 |
| 255 | 74.410 |

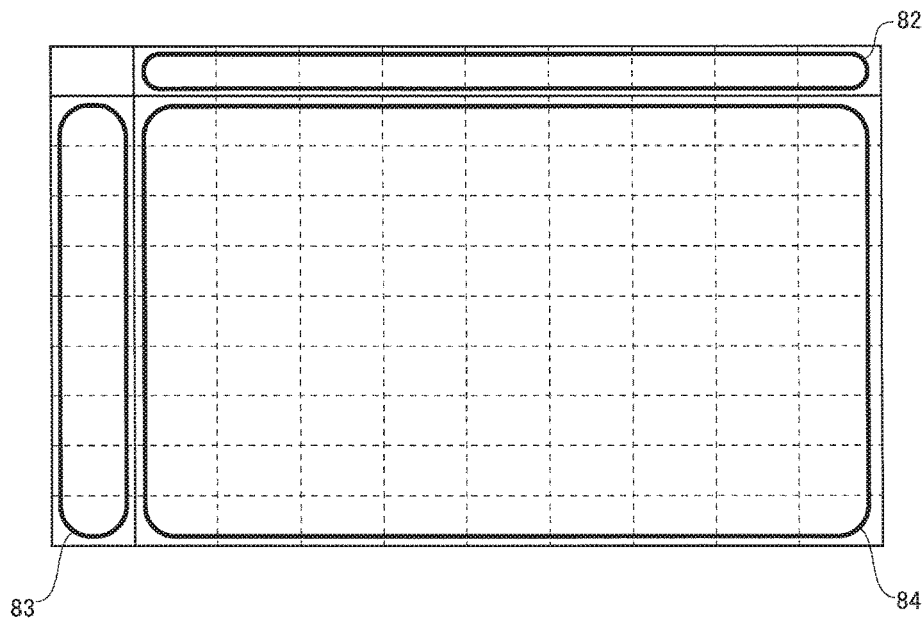

| GRADATION VALUE (8bit) | LUMINANCE VALUE (cd/m²) |
|---|---|
| ⋮ | ⋮ |
| 128 | 17.234 |
| ⋮ | ⋮ |
| 134 | 18.009 | ←—87
| ⋮ | ⋮ |
| 254 | 49.770 |
| 255 | 50.610 |

R1

| GRADATION VALUE (8bit) | LUMINANCE VALUE (cd/m²) |
|---|---|
| 0 | 0.053 |
| ⋮ | ⋮ |
| 128 | 16.376 |
| ⋮ | ⋮ |
| 134 | 18.107 | ←—88
| ⋮ | ⋮ |
| 253 | 73.133 |
| 254 | 73.770 |
| 255 | 74.410 |

R2

CALCULATE LIQUID CRYSTAL STATE VALUE

S210: MEASURE LUMINANCE VALUE CORRESPONDING TO EACH INPUT GRADATION VALUE

S220: MEASURE LUMINANCE VALUE USING VARIOUS APPLICATION GRADATION VALUES

S230: DETERMINE LIQUID CRYSTAL STATE VALUE

END

INPUT GRADATION VALUE IN DISPLAY FIELD

| | 0 | 32 | 64 | 96 | 128 | 160 | 192 | 224 | 255 |
|---|---|---|---|---|---|---|---|---|---|
| 0 | 0 | 41 | 80 | 107 | 135 | 165 | 197 | 230 | 255 |
| 32 | 0 | 32 | 68 | 100 | 134 | 164 | 197 | 229 | 255 |
| 64 | 0 | 25 | 64 | 98 | 132 | 163 | 196 | 229 | 255 |
| 96 | 0 | 17 | 61 | 96 | 130 | 162 | 195 | 228 | 255 |
| 128 | 0 | 2 | 57 | 95 | 128 | 161 | 194 | 227 | 255 |
| 160 | 0 | 0 | 54 | 93 | 127 | 160 | 193 | 226 | 255 |
| 192 | 0 | 0 | 50 | 91 | 125 | 160 | 192 | 225 | 255 |
| 224 | 0 | 0 | 47 | 90 | 123 | 159 | 192 | 224 | 255 |
| 255 | 0 | 0 | 43 | 88 | 121 | 158 | 191 | 224 | 255 |

LIQUID CRYSTAL STATE VALUE AT END TIME OF PREVIOUS FIELD

LIQUID CRYSTAL DISPLAY DEVICE AND METHOD OF DRIVING SAME

TECHNICAL FIELD

The present invention relates to a liquid crystal display device, and more specifically to a technique of preventing occurrence of color shift and flicker in a liquid crystal display device employing a field sequential system.

BACKGROUND ART

In general, in a liquid crystal display device that performs color display, one pixel is divided into three sub pixels of a red pixel, a green pixel, and a blue pixel, the red pixel being provided with a color filter that transmits red light, the green pixel being provided with a color filter that transmits green light, the blue pixel being provided with a color filter that transmits blue light. While color display is possible by use of the color filters provided in the three sub pixels, about two-thirds of light from a backlight which is applied to a liquid crystal panel is absorbed in the color filters. Hence a liquid crystal display device employing a color filter system has a problem of low efficiency in light utilization. Attention has thus been focused on a liquid crystal display device employing a field sequential system which performs color display without using color filters.

In a typical liquid crystal display device employing the field sequential system, one frame period, which is a display period of one screen, is divided into three fields. Although the field is also referred to as a sub frame, the term "field" will be used throughout the following description. For example, one frame period is divided into: a field (red field) that displays a red screen based on a red component of an input image signal; a field (green field) that displays a green screen based on a green component of the input image signal; and a field (blue field) that displays a blue screen based on a blue component of the input image signal. By displaying the primary colors one by one as described above, a color image is displayed on the liquid crystal panel. Since the color image is displayed in this manner, the color filters are not required in the liquid crystal display device employing the field sequential system. Accordingly, the efficiency in light utilization of the liquid crystal display device employing the field sequential system is about three times as high as that of the liquid crystal display device employing the color filter system. The liquid crystal display device employing the field sequential system is thus suited for high luminance and lower power consumption.

It should be noted that, in the present specification, a combination of a data value of the red component, a data value of the green component, and a data value of the blue component is referred to as an "RGB combination." For example, "R=128, G=32, B=255" is one RGB combination. In this example, a data value of the red component is 128, a data value of the green component is 32, and a data value of the blue component is 255. The data value is typically a gradation value.

Meanwhile, in the liquid crystal display device, an image is displayed by controlling a transmittance of each pixel with a voltage (liquid crystal application voltage). In this regard, it takes several milliseconds for the transmittance at each pixel to attain a target transmittance from the start of writing data (applying a voltage) into the pixels. Hence in the liquid crystal display device employing the field sequential system, in each field, a backlight of the corresponding color is switched from an unlighted state to a lighted state after the liquid crystal has responded to some extent.

Further, in the liquid crystal display device, a sufficient image quality may not be obtained, for example at the time of displaying a moving image, due to a low response speed of the liquid crystal. Then, as one of measures against the low response speed of the liquid crystal, a drive system called overdrive (overshooting drive) has conventionally been adopted. The overdrive is a drive system in which the liquid crystal panel is supplied with a drive voltage higher than a predetermined gradation voltage corresponding to a data value of an input image signal in the current frame or a drive voltage lower than a predetermined gradation voltage corresponding to a data value of an input image signal in the current frame in accordance with a combination of a data value of an input image signal in one previous frame and a data value of an input image signal in the current frame. That is, the overdrive leads to correction of an input image signal that emphasizes (not a spatial change but) a temporal change in a data value. By adopting the overdrive, in the current liquid crystal display device employing the color filter system, the liquid crystal makes a response such that the transmittance almost attains the target value (target transmittance) in each field.

It should be noted that the following prior art documents are known in relation to the present invention. Japanese Translation of PCT International Application Publication No. 2003-502687 discloses an invention concerning an operation to compensate color impurities in a color sequential LCD image display device. According to this invention, a signal of each color is corrected based on a signal of a preceding color. For example, when color display is performed in the order of "blue, green, and red", a green signal is corrected based on a blue signal. Further, Japanese Laid-Open Patent Publication No. H7-121138 discloses an invention concerning the color reproducibility in a time-division color liquid crystal display device. According to this invention, the scanning timing of a time-division light emitting device of three primary colors is delayed by an optical response speed of liquid crystal, and a non-emission period corresponding to the optical response time of the liquid crystal is provided. Moreover, at the time of writing data into a pixel, gamma correction is performed in accordance with a result of comparison between data in a previous field (a field one field before the current field) and data in the current field. Moreover, WO 2010/084619 A discloses an invention in which the overdrive is applied to the liquid crystal display device employing the field sequential system.

PRIOR ART DOCUMENTS

Patent Documents

[Patent Document 1] Japanese Translation of PCT International Application Publication No. 2003-502687
[Patent Document 2] Japanese Laid-Open Patent Publication No. H7-121138
[Patent Document 3] WO 2010/084619 A

SUMMARY OF THE INVENTION

Problems to be Solved by the Invention

As described above, in the current liquid crystal display device employing the color filter system, the liquid crystal makes a response such that a transmittance almost attains a target value in each field, by adopting the overdrive. Hence a sufficient image quality has been obtained. However, in the liquid crystal display device employing the field sequential system, even when the transmittance attains the target value in each field by the overdrive, a sufficient image quality cannot be obtained due to the following reason. In the liquid crystal display device employing the field sequential system, the backlight is switched from the unlighted state to the lighted state in the middle of each field as described above. However, the transmittance has not yet attained the target value at the start time of lighting the backlight, and hence a liquid crystal state (an aligned state of liquid crystal molecules) changes even during the backlight lighting period. For this reason, the liquid crystal state at the end time of each field and luminance which is actually displayed in each field (display luminance) are not in one-to-one correspondence relationship. Thus, in the conventional overdrive, the balance (chromaticity) of colors to be displayed in each field cannot be preferably controlled. This leads to the occurrence of color shift. As thus described, in the liquid crystal display device employing the field sequential system, even when the transmittance attains the target value in each field by the overdrive, a sufficient image quality cannot be obtained.

A consideration will be given of displaying a color in the RGB combination of "R=128, G=128, B=32" on a liquid crystal display device using 8-bit gradation data of each color. Note that in FIGS. 48 to 50, reference character TR denotes a lighting period of the red backlight, reference character TG denotes a lighting period of the green backlight, and reference character TB denotes a lighting period of the blue backlight. Further, in FIGS. 48 to 50, a change in liquid crystal state is represented by a change in gradation value.

If response characteristics of liquid crystal molecules are ideal, that is, the response time of the liquid crystal in switching of fields is constantly zero, then the liquid crystal state changes as indicated by a heavy line 91 in FIG. 48 even when the overdrive is not adopted. At this time, the RGB combination concerning the display gradation value is "R=128, G=128, B=32." However, in practice, the response time of the liquid crystal is not zero. Thus, when the overdrive is not adopted, the liquid crystal state changes as indicated by a heavy line 92 in FIG. 49, for example. At this time, an RGB combination concerning attainment gradation value at the end time of each of the red field, the green field, and the blue field is, for example, "R=102, G=120, B=65." As thus described, a desired attainment gradation value is not obtained at the end time of each field when the overdrive is not adopted. Note that the liquid crystal state changes even during the backlight lighting period, and hence the RGB combination concerning the display gradation value is, for example, "R=90, G=114, B=81."

When the overdrive is adopted, the liquid crystal state changes as indicated by a heavy line 93 in FIG. 50, for example. At this time, the RGB combination concerning the attainment gradation value at the end time of each of the red field, the green field, and the blue field is "R=128, G=128, B=32." As described above, the liquid crystal makes a response so as to obtain a desired attainment gradation value at the end time of each field. However, since the liquid crystal state changes even during the backlight lighting period as described above, desired display luminance has not been obtained. The RGB combination concerning the display gradation value is, for example, "R=99, G=128, B=60." As described above, in the liquid crystal display device employing the field sequential system, color shift occurs even when the overdrive is adopted.

Further, the liquid crystal display device employing the field sequential system has a problem in which flicker easily occurs (flicker can be easily perceived by an observer). This will be described below. In the liquid crystal display device employing the field sequential system, as described above, one frame period is divided into three fields, for example. Then, video images with different colors are respectively displayed in the three fields. The video images in the three fields are overlapped through an afterimage phenomenon on the retina of the observer, and an image for one frame is thus perceived by the observer.

According to the field sequential system, the lighted state of the light source (backlight) changes in every field. In the forgoing example, only the red light source is in the lighted state in the red field, only the green light source is in the lighted state in the green field, and only the blue light source is in the lighted state in the blue field. Since the lighted state of the light source changes in every field, in the liquid crystal display device with one frame period divided into three fields, when a frame frequency is 60 Hz, a drive frequency of the overall light source is 180 Hz. However, when attention is focused only on the light source of one color, the drive frequency of the light source of the color is 60 Hz. It is generally known that, when the lighted state of the light source is controlled with a drive frequency lower than 70 Hz, a change in lighted state is perceived by the observer as flicker. In the liquid crystal display device employing the color filter system, the luminance of the light source is constant, whereas in the liquid crystal display device employing the field sequential system, the luminance changes depending on the drive frequency of the light source (single-color light source) of each color. Since the luminance change occurs with a frequency of 60 Hz for each color, flicker is perceived by human eyes.

Accordingly, it is an object of the present invention to realize a liquid crystal display device employing a field sequential system which is capable of preventing the occurrence of color shift and flicker.

Means for Solving the Problems

A first aspect of the present invention is directed to a liquid crystal display device employing a field sequential system, the liquid crystal display device having a backlight including light sources of a plurality of colors, and performing color display by switching a lighting pattern representing a combination of a lighted state and an unlighted state of the light sources of the plurality of colors in every field, the liquid crystal device including:

a liquid crystal panel configured to display an image;

a backlight configured to irradiate the liquid crystal panel with light;

an input image data separating unit configured to separate input image data into input gradation data for each lighting pattern;

a high refresh rate processing unit configured to divide one frame period into a plurality of fields, the number of which is greater than the number of lighting patterns, and convert the input gradation data for each lighting pattern to input gradation data for each field by allocating the input gradation data obtained by the input image data separating unit to the plurality of fields such that a cycle in which the same lighting pattern appears is shorter than a cycle in which input image data for one frame period is inputted, a data correcting unit configured to obtain liquid crystal state data that is data corresponding to an expected attainment gradation for an end time of each field, and obtain application gradation data that is data corresponding to a voltage to be applied to the liquid crystal panel by correcting the input gradation data for each field obtained by the high refresh rate processing unit;

a liquid crystal panel driving unit configured to drive the liquid crystal panel based on the application gradation data; and a backlight driving unit configured to drive the backlight such that the liquid crystal panel is irradiated with light of a color corresponding to the lighting pattern in every field, wherein the data correcting unit includes a liquid crystal state data acquiring unit configured to obtain liquid crystal state data for a current field based on input gradation data for the current field and liquid crystal state data for a field one field before the current field, and an application gradation data acquiring unit configured to obtain application gradation data for the current field by correcting the input gradation data for the current field based on the liquid crystal state data for the field one field before the current field, and the application gradation data acquiring unit obtains the application gradation data for the current field such that display luminance in each field becomes display luminance corresponding to the input gradation data obtained by the high refresh rate processing unit.

According to a second aspect of the present invention, in the first aspect of the present invention, the data correcting unit further includes a field memory capable of holding data for one field, one frame period is divided into P (P is an integer not less than four) fields, liquid crystal state data for a Pth field is held in the field memory, the liquid crystal state data acquiring unit for a first field obtains liquid crystal state data for the first field of the current frame based on input gradation data for the first field of the current frame and the liquid crystal state data for the Pth field of a previous frame, that is held in the field memory, the application gradation data acquiring unit for the first field obtains application gradation data for the first field of the current frame by correcting the input gradation data for the first field of the current frame based on the liquid crystal state data for the Pth field of the previous frame, that is held in the field memory, the liquid crystal state data acquiring unit for a Qth (Q is an integer not less than two and not greater than P) field obtains liquid crystal state data for the Qth field of the current frame based on input gradation data for the Qth field of the current frame and liquid crystal state data for a (Q−1)th field of the current frame, and the application gradation data acquiring unit for the Qth field obtains application gradation data for the Qth field of the current frame by correcting the input gradation data for the Qth field of the current frame based on the liquid crystal state data for the (Q−1)th field of the current frame.

According to a third aspect of the present invention, in the first aspect of the present invention, the high refresh rate processing unit converts input gradation data for each lighting pattern to input gradation data for each field such that prepared lighting patterns repeatedly appear in predetermined order, while the lighting pattern is switched in every field.

According to a fourth aspect of the present invention, in the first aspect of the present invention, the liquid crystal state data acquiring unit has a liquid crystal state data acquiring look-up table that stores a value associated with input gradation data for the current field, a value associated with liquid crystal state data for the field one field before the current field, and a value corresponding to a combination of the value associated with the input gradation data for the current field and the value associated with the liquid crystal state data for the field one field before the current field, and obtains liquid crystal state data for the current field based on the liquid crystal state data acquiring look-up table, and the application gradation data acquiring unit has an application gradation data acquiring look-up table that stores a value associated with input gradation data for the current field, a value associated with liquid crystal state data for the field one field before the current field, and a value corresponding to a combination of the value associated with the input gradation data for the current field and the value associated with the liquid crystal state data for the field one field before the current field, and obtains application gradation data for the current field based on the application gradation data acquiring look-up table.

According to a fifth aspect of the present invention, in the first aspect of the present invention, the light sources of the plurality of colors include a red light source, a green light source, and a blue light source, and a first lighting pattern, a second lighting pattern, and a third lighting pattern are prepared as lighting patterns, the first lighting pattern putting only the red light source in the lighted state, the second lighting pattern putting only the green light source in the lighted state, the third lighting pattern putting only the blue light source in the lighted state.

According to a sixth aspect of the present invention, in the fifth aspect of the present invention, the high refresh rate processing unit divides one frame period into four fields.

According to a seventh aspect of the present invention, in the fifth aspect of the present invention, the high refresh rate processing unit divides one frame period into five fields.

According to an eighth aspect of the present invention, in the first aspect of the present invention, the light sources of the plurality of colors include a red light source, a green light source, and a blue light source, and a first lighting pattern, a second lighting pattern, a third lighting pattern, and a fourth lighting pattern are prepared as lighting patterns, the first lighting pattern putting only the red light source in the lighted state, the second lighting pattern putting only the green light source in the lighted state, the third lighting pattern putting only the blue light source in the lighted state, the fourth lighting pattern putting the red light source, the green light source, and the blue light source in the lighted state.

According to a ninth aspect of the present invention, in the eighth aspect of the present invention, the high refresh rate processing unit divides one frame period into five fields.

According to a tenth aspect of the present invention, in the eighth aspect of the present invention, the high refresh rate processing unit divides one frame period into six fields.

According to an eleventh aspect of the present invention, in the first aspect of the present invention, the liquid crystal panel includes pixel electrodes arranged in a matrix form, a common electrode disposed so as to face the pixel electrodes, liquid crystal held between the pixel electrodes and the common electrode, scanning signal lines, video signal lines, to which video signals in accordance with the application gradation data are applied, a thin film transistors each having a control terminal connected to one of the scanning signal lines, a first conductive terminal connected to one of the video signal lines, a second conductive terminal connected to one of the pixel electrodes, and a channel layer formed of an oxide semiconductor.

According to a twelfth aspect of the present invention, in the eleventh aspect of the present invention, the oxide semiconductor includes indium, gallium, zinc, and oxygen as main components.

A thirteenth aspect of the present invention is directed to a method of driving a liquid crystal display device employing a field sequential system, the liquid crystal display device including a liquid crystal panel configured to display an image and a backlight including light sources of a plurality of colors and configured to irradiate the liquid crystal panel with light, and performing color display by switching a lighting pattern representing a combination of a lighted state and an unlighted state of the light sources of the plurality of colors in every field, the method including:

an input image data separating step of separating input image data into input gradation data for each lighting pattern;

a high refresh rate processing step of dividing one frame period into a plurality of fields, the number of which is greater than the number of lighting patterns, and converting the input gradation data for each lighting pattern to input gradation data for each field by allocating the input gradation data obtained by the input image data separating step to the plurality of fields such that a cycle in which the same lighting pattern appears is shorter than a cycle in which input image data for one frame period is inputted;

a data correcting step of obtaining liquid crystal state data that is data corresponding to an expected attainment gradation for an end time of each field, and obtaining application gradation data that is data corresponding to a voltage to be applied to the liquid crystal panel by correcting the input gradation data for each field obtained by the high refresh rate processing step;

a liquid crystal panel driving step of driving the liquid crystal panel based on the application gradation data; and a backlight driving step of driving the backlight such that the liquid crystal panel is irradiated with light of a color corresponding to the lighting pattern in every field, wherein the data correcting step includes a liquid crystal state data acquiring step of obtaining liquid crystal state data for a current field based on input gradation data for the current field and liquid crystal state data for a field one field before the current field, and an application gradation data acquiring step of obtaining application gradation data for the current field by correcting input gradation data for the current field based on liquid crystal state data for the field one field before the current field, and in the application gradation data acquiring step, the application gradation data for the current field is obtained such that display luminance in each field becomes display luminance corresponding to the input gradation data obtained by the high refresh rate processing step.

Effects of the Invention

According to the first aspect of the present invention, the liquid crystal display device employing the field sequential system includes: the liquid crystal state data acquiring unit configured to obtain liquid crystal state data for the current field based on input gradation data for the current field and liquid crystal state data (data corresponding to an expected attainment gradation for the end time of the previous field) for the previous field (a field one field before the current field); and the application gradation data acquiring unit configured to obtain application gradation data for the current field by correcting input gradation data for the current field based on liquid crystal state data for the previous field. It is thus possible to make a correction that emphasizes a temporal change in data value on input image data such that an integral value of luminance in the backlight lighting period becomes target display luminance, while considering a change in liquid crystal state in every field in the past. Hence it is possible to obtain desired display luminance in each field even when the liquid crystal state changes during the backlight lighting period. Further, one frame period is divided into fields, the number of which is greater than the number of prepared lighting patterns. A cycle in which the same lighting pattern appears is made shorter than a cycle in which input image data for one frame is inputted. Hence a frequency of the luminance change based on each lighting pattern becomes higher than in the conventional case. As a result, the occurrence of flicker is prevented. As described above, there is realized the liquid crystal display device employing the field sequential system which is capable of preventing the occurrence of color shift and flicker.

According to the second aspect of the present invention, the same effect as that of the first aspect of the present invention is reliably obtained.

According to the third aspect of the present invention, in the configuration in which each frame period is divided into fields, the number of which is greater than the number of lighting patterns, the prepared lighting patterns repeatedly appear in predetermined order, while the lighting pattern is switched in every field. Hence the cycle of the luminance change based on each lighting pattern reliably becomes shorter than in the conventional case. As a result, the occurrence of flicker is effectively prevented.

According to the fourth aspect of the present invention, even when many kinds of liquid crystal panels are present, it is only required to change a value in the look-up table (the liquid crystal state data acquiring look-up table and the application gradation data acquiring look-up table) depending on response characteristics of each liquid crystal panel.

According to the fifth aspect of the present invention, in the liquid crystal display device employing the field sequential system in which typical lighting patterns are prepared, the same effect as that of the first aspect of the present invention is obtained.

According to the sixth aspect of the present invention, in the configuration in which one frame period is divided into four fields, a screen of the same color (a screen of a color based on the same lighting pattern) is displayed every three fields. Thus, when the frame frequency is 60 Hz, the frequency of the luminance change based on each lighting pattern is 80 Hz. Accordingly, the occurrence of flicker is effectively prevented.

According to the seventh aspect of the present invention, in the configuration in which one frame period is divided into five fields, a screen of the same color (a screen of a color based on the same lighting pattern) is displayed every three fields. Thus, when the frame frequency is 60 Hz, the frequency of the luminance change based on each lighting pattern is 100 Hz. Accordingly, the occurrence of flicker is reliably prevented.

According to the eighth aspect of the present invention, there is provided a lighting pattern that puts all of the red light source, the green light source, and the blue light source in the lighted state. One frame period thus includes a field in which a mixed color component of the three primary colors is displayed. Accordingly, the occurrence of color breakup is prevented. As described above, there is realized the liquid crystal display device employing the field sequential system which is capable of preventing the occurrence of color breakup, color shift, and flicker.

According to the ninth aspect of the present invention, in the configuration in which one frame period is divided into five fields, a screen of the same color (a screen of a color based on the same lighting pattern) is displayed every four fields. Thus, when the frame frequency is 60 Hz, the frequency of the luminance change based on each lighting pattern is 75 Hz. Accordingly, the occurrence of flicker is effectively prevented.

According to the tenth aspect of the present invention, in the configuration in which one frame period is divided into six fields, a screen of the same color (a screen of a color based on the same lighting pattern) is displayed every four fields. Thus, when the frame frequency is 60 Hz, the frequency of the luminance change based on each lighting pattern is 90 Hz. Accordingly, the occurrence of flicker is reliably prevented.

According to the eleventh aspect of the present invention, in the liquid crystal display device employing the field sequential system, a thin film transistor with a channel layer formed of an oxide semiconductor is used as the thin film transistor provided in the liquid crystal panel. It is thus possible to make a writing speed higher than in the conventional case in addition to obtaining the effects of higher definition and lower power consumption. Accordingly, the occurrence of color shift is more effectively prevented.

According to the twelfth aspect of the present invention, by using indium gallium zinc oxide as the oxide semiconductor that forms the channel layer, it is possible to reliably achieve the same effect as that of the eleventh aspect of the present invention.

According to the thirteenth aspect of the present invention, the same effect as that of the first aspect of the present invention can be exerted in the method of driving the liquid crystal display device employing the field sequential system.

BRIEF DESCRIPTION OF THE DRAWINGS

FIG. 8 is a waveform diagram for describing data required for obtaining an application gradation value in a display field.

FIG. 9 is a waveform diagram for describing data required for obtaining a liquid crystal state value at an end time of a previous field.

FIG. 13 is a diagram for describing a method of obtaining an application gradation value.

FIG. 14 is one example of a gradation luminance table.

FIG. 15 is a diagram for describing the method of obtaining an application gradation value.

FIG. 16 is a diagram for describing the method of obtaining an application gradation value.

FIG. 20 is a diagram for describing an application gradation value acquiring look-up table.

FIG. 21 is a diagram for describing an application gradation value acquiring look-up table.

MODES FOR CARRYING OUT THE INVENTION

<0. Introduction>

Prior to description of embodiments, an outline of the present invention will be described with reference to FIGS. 2 to 27. It should be noted that, in the description herein and the description of each embodiment, a liquid crystal display device capable of displaying 256 gradations is taken as an example. A combination of a lighted state and an unlighted state of light sources of a plurality of colors prepared as the backlight is referred to as a "lighting pattern." For example, one lighting pattern is as follows: "the red light source is in the lighted state, the green light source is in the unlighted state, and the blue light source is in the unlighted state" (only the red light source is lighted).

<0.1 Measures Against Flicker>

As described above, the liquid crystal display device employing the field sequential system has a problem in which flicker easily occurs. Hence in the liquid crystal display device according to the present invention, in order to reduce the cycle of the luminance change based on each lighting pattern, a cycle in which the same lighting pattern appears (a cycle in which the state of the light source of each light source is controlled based on the same lighting pattern) is made shorter than a cycle in which an input image signal for one frame is inputted from the outside. More specifically, the number of fields constituting one frame period is made greater than the number of previously prepared lighting patterns, to perform a high refresh rate process in which the screen is switched (updated) at a high speed. For example, when three lighting patterns, i.e., "lighting only the red light source", "lighting only the green light source", and "lighting only the blue light source" are prepared, one frame period is divided into four or more fields. Further, for example, when four lighting patterns, i.e., "lighting only the red light source", "lighting only the green light source", "lighting only the blue light source", and "lighting the red light source, the green light source, and the blue light source" are prepared, one frame period is divided into five or more fields. Hereinafter, a specific technique of the high refresh rate process will be described.

Figure 2:
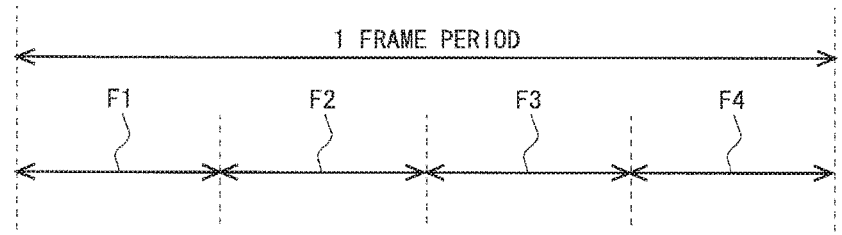
FIG. 2 is a diagram showing one configuration example of one frame period in the present invention.

A description will be given herein taking as an example the case of preparing three lighting patterns, i.e., "lighting only the red light source", "lighting only the green light source", and "lighting only the blue light source", as in the typical field sequential system. It should be noted that, for the convenience of description, the lighting pattern of "lighting only the red light source" is referred to as a "first lighting pattern", the lighting pattern of "lighting only the green light source" is referred to as a "second lighting pattern", and the lighting pattern of "lighting only the blue light source" is referred to as a "third lighting pattern." When the three lighting patterns are prepared as described above, for example, one frame period includes four fields, i.e., a first field F1, a second field F2, a third field F3, and a fourth field F4, as shown in FIG. 2. The lighting pattern that appears in each field changes in every field in the order of "the first lighting pattern, the second lighting pattern, and the third lighting pattern." Accordingly, the change in lighting pattern in the three consecutive periods is as shown in FIG. 3, for example.

Figure 3:
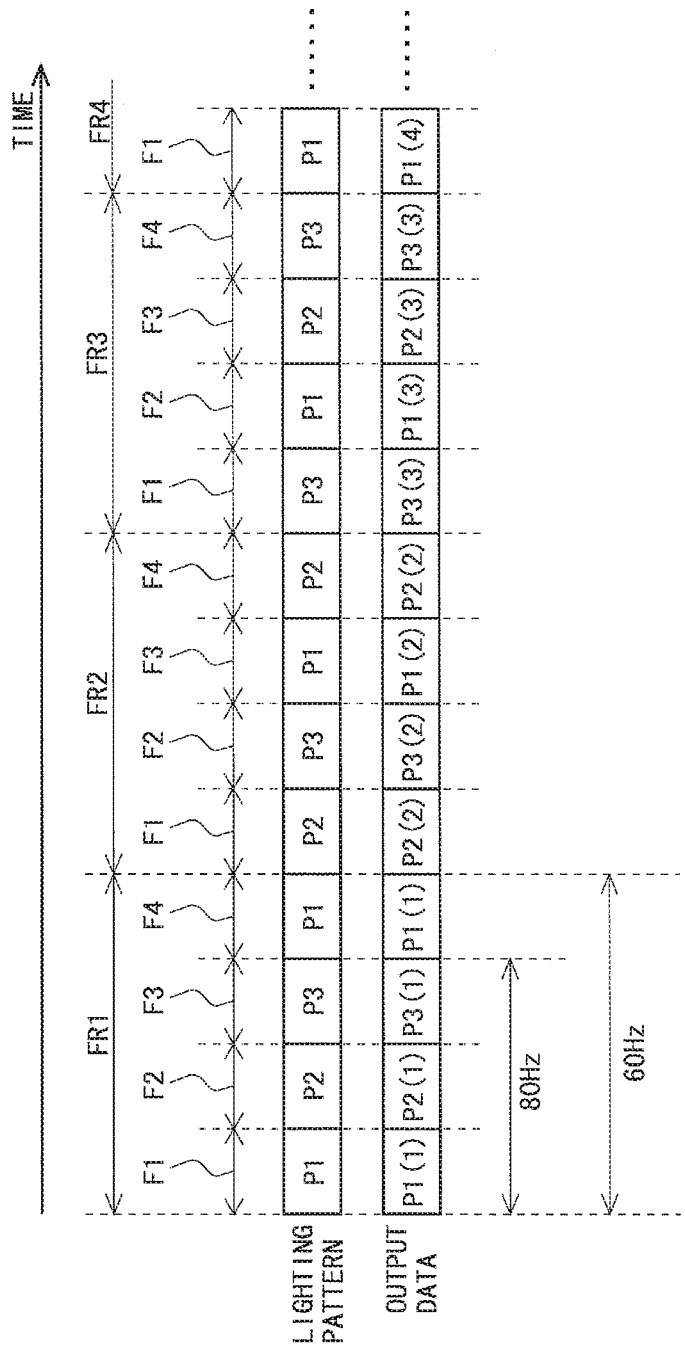
FIG. 3 is a diagram showing one example of a change in lighting pattern in three consecutive frame periods in the present invention.
Figure 4:
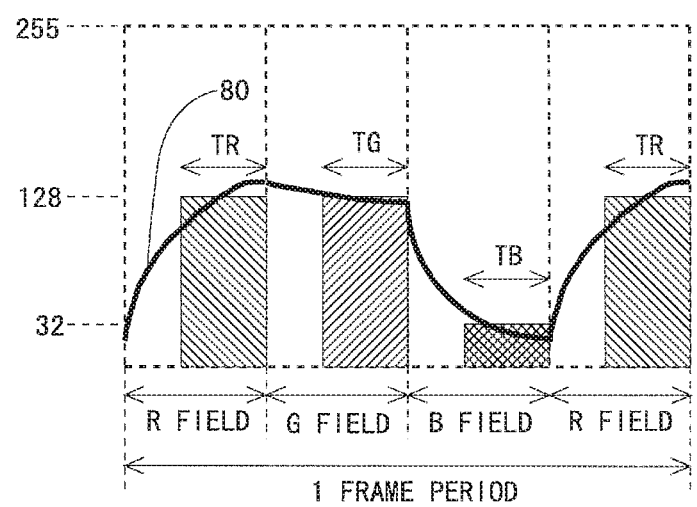
FIG. 4 is a waveform diagram for describing a method of obtaining desired display luminance in a liquid crystal display device employing a field sequential system.

In FIG. 3, reference characters FR1 to FR3 denote the first to third frames, and reference characters P1 to P3 denote the first to third lighting patterns. As for sections of output data, reference character Pi (j) denotes data for an ith lighting pattern which is obtained by an input image signal in a jth frame. As shown in FIG. 3, in the first frame, the state of the light source of each color is controlled in the order of "the first lighting pattern, the second lighting pattern, the third lighting pattern, and the first lighting pattern". In the second frame, the state of the light source of each color is controlled in the order of "the second lighting pattern, the third lighting pattern, the first lighting pattern, and the second lighting pattern". In the third frame, the state of the light source of each color is controlled in the order of "the third lighting pattern, the first lighting pattern, the second lighting pattern, and the third lighting pattern." Then, in the first field of the fourth frame, the state of the light source of each color is controlled in the first lighting pattern.

Meanwhile, an input image signal for one screen is inputted into the liquid crystal display device every one frame period. The input image signal is separated into data for the first lighting pattern, data for the second lighting pattern, and data for the third lighting pattern. In the field set to the first lighting pattern, the data for the first lighting pattern is taken as output data. In the field set to the second lighting pattern, the data for the second lighting pattern is taken as output data. In the field set to the third lighting pattern, the data for the third lighting pattern is taken as output data. Specifically, in the first frame, the data for the first lighting pattern is taken as output data in the first field and the fourth field, the data for the second lighting pattern is taken as output data in the second field, and the data for the third lighting pattern is taken as output data in the third field. In the second frame, the data for the second lighting pattern is taken as output data in the first field and the fourth field, the data for the third lighting pattern is taken as output data in the second field, and the data for the first lighting pattern is taken as output data in the third field. In the third frame, the data for the third lighting pattern is taken as output data in the first field and the fourth field, the data for the first lighting pattern is taken as output data in the second field, and the data for the second lighting pattern is taken as output data in the third field.

In the liquid crystal display device according to the present invention, in order to prevent the occurrence of flicker, the high refresh rate process as described above is performed to increase the frequency of the luminance change based on each lighting pattern. In the foregoing example, the frequency of the luminance change based on each lighting pattern is 80 Hz. Note that the specific technique of the high refresh rate process is not limited to the foregoing technique. That is, the high refresh rate process may be performed using a technique different from the foregoing technique.

<0.2 Measures Against Color Shift>

As described above, in the liquid crystal display device employing the field sequential system, even when the transmittance attains the target value in each field by the overdrive, the liquid crystal state changes even during the backlight lighting period, which causes the occurrence of color shift. Accordingly, as a method of enabling desired display luminance to be obtained in the liquid crystal display device employing the field sequential system, it is considered that an application gradation value (a gradation value associated with a value of a voltage to be actually applied to the liquid crystal) in each field is controlled such that the liquid crystal state changes as indicated by a heavy line 80 in FIG. 4. That is, it is considered that the temporal change in data value is further emphasized than in the overdrive such that an integral value of luminance in the backlight lighting period becomes target display luminance. It should be noted that, in the example shown in FIG. 4, the RGB combination concerning the input gradation value (target display gradation values) is "R=128, G=128, B=32", the RGB combination concerning the target attainment gradation value is "R=183, G=105, B=2", and the RGB combination concerning the application gradation value is "R=238, G=89, B=0." Further, there is shown an example in which, for the measure against flicker described above, one frame period is divided into four fields in the liquid crystal display device where the three lighting patterns (lighting only the red light source, lighting only the green light source, and lighting only the blue light source) are prepared.

Figure 5:
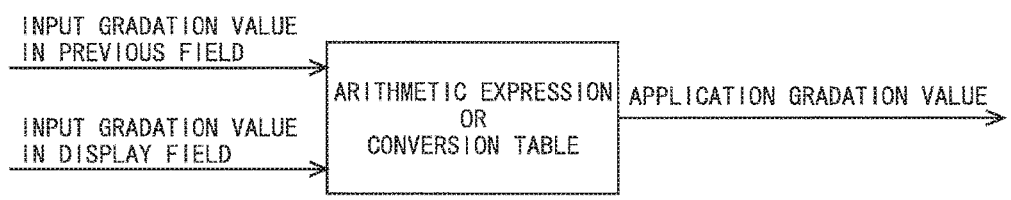
FIG. 5 is a diagram for describing conventional overdrive.

Meanwhile, according to the conventional overdrive, an application gradation value in the display field is obtained based on an input gradation value in a previous field (a field one field before the display field) and an input gradation value in the display field. That is, as shown in FIG. 5, by using an arithmetic expression or a conversion table, the application gradation value in the display field is obtained based on the input gradation value in the previous field and the input gradation value in the display field. In other words, depending on the input gradation value in the previous field, the input gradation value in the display field is converted to the application gradation value in the display field.

It will be considered that, for example, a color in the RGB combination of "R=128, G=128, B=32" is displayed as a first case, and a color in the RGB combination of "R=128, G=128, B=94" is displayed as a second case.

Figure 6:
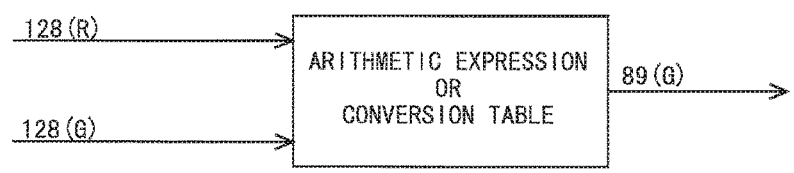
FIG. 6 is a diagram for describing the conventional overdrive.

In the first case, the RGB combination concerning the target attainment gradation value is "R=183, G=105, B=2." The RGB combination concerning the application gradation value for realizing the above by use of the overdrive is "R=238, G=89, B=0." Accordingly, for example, when attention is focused on an application gradation value in the green field, a value "89" should be obtained based on an input gradation value "128" in the red field and an input gradation value "128" in the green field by use of the arithmetic expression or the conversion table, as shown in FIG. 6.

Figure 7:
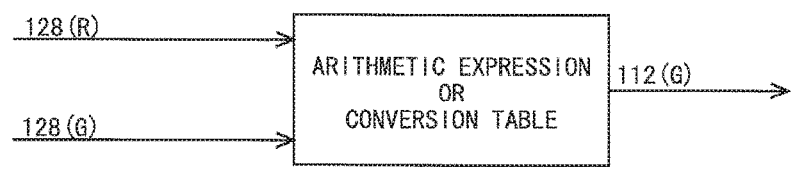
FIG. 7 is a diagram for describing the conventional overdrive.

In the second case, the RGB combination concerning the target attainment gradation value is "R=148, G=120, B=84." The RGB combination concerning the application gradation value for realizing the above by use of the overdrive is "R=168, G=112, B=72." Accordingly, when attention is focused on an application gradation value in the green field, a value "112" should be obtained based on an input gradation value "128" in the red field and an input gradation value "128" in the green field by use of the arithmetic expression or the conversion table, as shown in FIG. 7.

Regarding the foregoing example, two data values inputted into the arithmetic expression or the conversion table in the first case and two data values inputted into the arithmetic expression or the conversion table in the second case are the same. However, the data value to be obtained in the first case and the data value to be obtained in the second case are different. This means that "when only the same arithmetic expression or the same conversion table as in the conventional case is used, it is not possible to obtain an application gradation value such that an integral value of luminance in the backlight lighting period becomes target display luminance."

Hence in the present invention, as described below, a data conversion process different from that in the conventional case is performed to obtain an application gradation value in each field such that an integral value of luminance in the backlight lighting period becomes target display luminance. It should be noted that, in the following, a gradation value corresponding to the liquid crystal state (an aligned state of liquid crystal molecules) at each time is referred to as a "liquid crystal state value."

When one target display luminance (luminance corresponding to an input gradation value) is to be obtained in the display field (current field), as understood from FIG. 8, a target attainment gradation value differs depending on a liquid crystal state value at the end time of the previous field (a field one field before the display field). In the example shown in FIG. 8, when the liquid crystal state value at the end time of the previous field is relatively low, the target attainment gradation value in the display field is high as compared with a case where the liquid crystal state value at the end time of the previous field is relatively high. Further, when the liquid crystal state value at the end time of the previous field is relatively low, the application gradation value in the display field is also high as compared with the case where the liquid crystal state value at the end time of the previous field is relatively high. Accordingly, the application gradation value in the display field should be obtained based on the input gradation value in the display field and the liquid crystal state value at the end time of the previous field. That is, as data for obtaining the application gradation value in the display field, the liquid crystal state value at the end time of the previous field is required in addition to the input gradation value in the display field.

Further, regarding the previous field, when attention is focused on one target display luminance, the liquid crystal state value at the end time of the previous field differs depending on a liquid crystal state value at the end time of a field two fields before the display field, as understood from FIG. 9. In the example shown in FIG. 9, when the liquid crystal state value at the end time of the field two fields before the display field is relatively low, the liquid crystal state value at the end time of the previous field is high as compared with a case where the liquid crystal state value at the end time of the field two fields before the display field is relatively high. Accordingly, the liquid crystal state value at the end time of the previous field should be obtained based on the input gradation value in the previous field and the liquid crystal state value at the end time of the field two fields before the display field. That is, as data for obtaining the liquid crystal state value at the end time of the previous field, the liquid crystal state value at the end time of the field two fields before the display field is required in addition to the input gradation value in the previous field.

Figure 10:
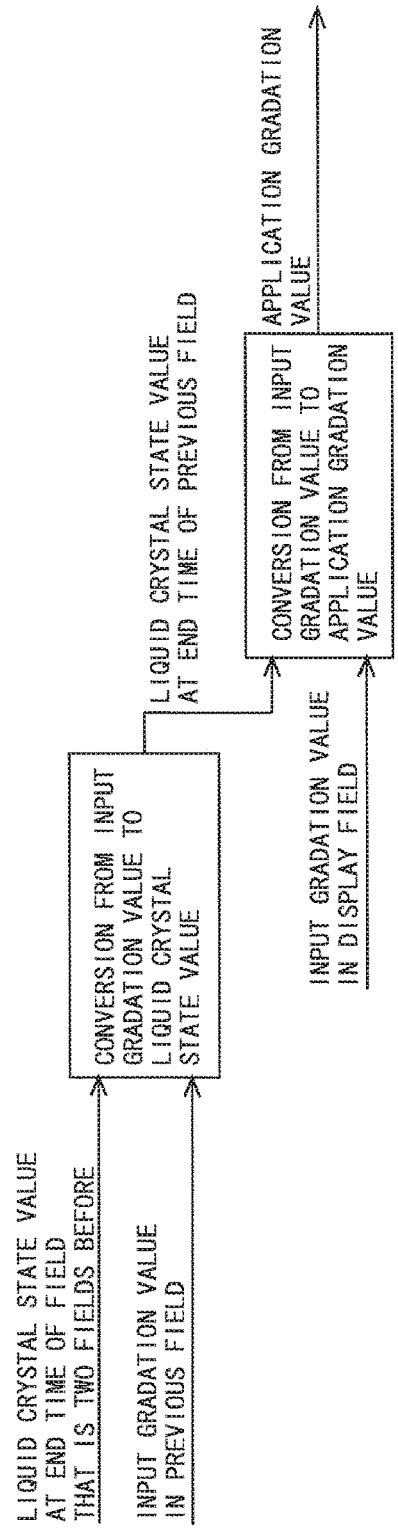
FIG. 10 is a diagram for describing a data conversion process for obtaining an application gradation value in the display field.

Considering the above, in the present invention, as the data conversion process for obtaining the application gradation value in the display field, the following processes are to be performed as shown in FIG. 10: "a process of converting the input gradation value in the previous field to the liquid crystal state value at the end time of the previous field depending on the liquid crystal state value at the end time of the field that is two fields before"; and "a process of converting the input gradation value in the display field to the application gradation value in the display field depending on the liquid crystal state value at the end time of the previous field."

Figure 11:
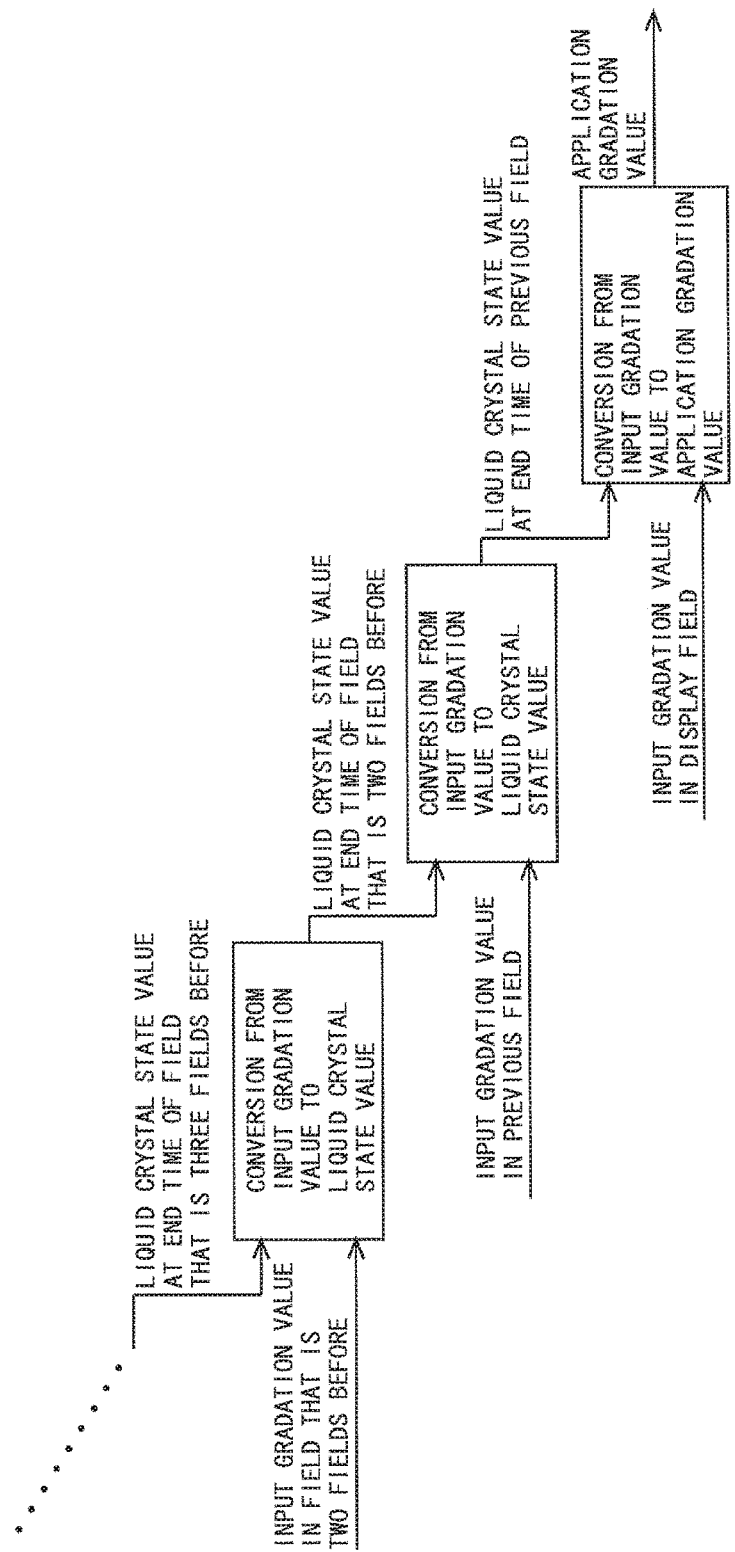
FIG. 11 is a diagram for describing the data conversion process for obtaining an application gradation value in the display field.

Meanwhile, "the liquid crystal state value at the end time of the field that is two fields before" in FIG. 10 are obtained by converting "the input gradation value in the field that is two fields before" based on "a liquid crystal state value at the end time of a field that is three fields before." As thus described, the liquid crystal state value at the end time of each field is obtained considering the liquid crystal state value at the end time of every field in the past as shown in FIG. 11.

Figure 12:
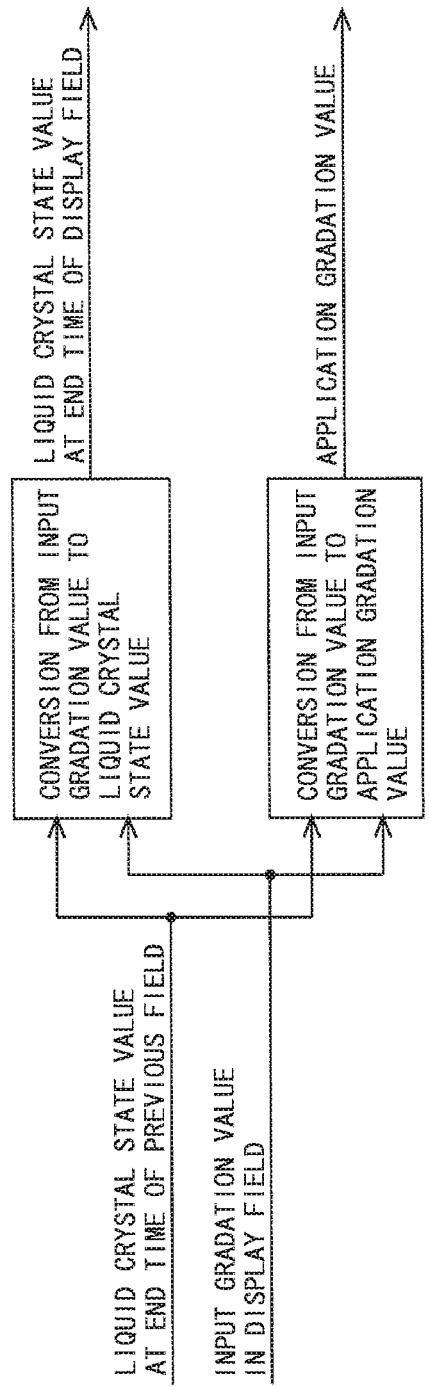
FIG. 12 is a diagram for describing the data conversion process that is performed when data for any display field is inputted.

Further, the liquid crystal state value at the end time of the display field is used for obtaining an application gradation value in a field subsequent to the display field. Therefore, when data for any display field is inputted, the following processes are performed as shown in FIG. 12: "a process of converting the input gradation value in the display field to the liquid crystal state value at the end time of the display field depending on the liquid crystal state value at the end time of the previous field"; and "a process of converting the input gradation value in the display field to the application gradation value in the display field depending on the liquid crystal state value at the end time of the previous field."

Thus, the liquid crystal display device according to the present invention is provided with: a data converting unit (hereinafter referred to as a "liquid crystal state value acquiring unit") configured to obtain a liquid crystal state value at the end time of the display field (current field) based on an input gradation value in the display field and a liquid crystal state value at the end time of the field one field before the display field; and a data converting unit (hereinafter referred to as an "application gradation value acquiring unit") configured to obtain an application gradation value in the display field by correcting an input gradation value in the display field based on a liquid crystal state value at the end time of the field one field before the display field.

<0.2.1 Method of Obtaining Application Gradation Value>

As described above, in the present invention, the application gradation value in the display field is obtained based on the input gradation value in the display field and the liquid crystal state value at the end time of the previous field. For realizing this, the liquid crystal display device according to the present invention is provided with a conversion table that stores "a value associated with the input gradation value in the display field", "a value associated with the liquid crystal state value at the end time of the previous field", and "an application gradation value corresponding to a combination of those values." Here, "a value associated with the input gradation value in the display field" is an input gradation value that can be taken in the corresponding liquid crystal display device, and "a value associated with the liquid crystal state value at the end time of the previous field" is a liquid crystal state value that can be taken in the liquid crystal display device. Note that, in place of the conversion table, a process using an arithmetic expression for performing the same conversion may be performed. Hereinafter, a description will be given of how to obtain an application gradation value to be stored into the conversion table. Note that an individual value to be stored into the conversion table is referred to as a parameter.

First, a luminance value corresponding to each gradation value (input gradation value) at the time of performing white lighting (i.e., lighting of the light sources of all colors) is measured. For example, when a luminance value corresponding to a gradation value "128" is to be measured, an application gradation value in every field is set to "128" (i.e., a voltage corresponding to an application gradation value "128" is applied to a liquid crystal panel 400), and the backlight is then lighted only in a field to be measured, as shown in FIG. 13. At that time, in the field to be measured, the backlight is lighted only for a period depending on a duty cycle assumed in the target liquid crystal display device. For example, when an assumed duty cycle is one-half, the backlight is lighted only for a latter half of the period of the field to be measured. A luminance value at the time of lighting the backlight as thus described is measured by a luminance meter, for example. By making the application gradation value in every field the same as thus described, it is possible to obtain the luminance value corresponding to each gradation value at the time of no change in liquid crystal state. As a result, a "gradation luminance table" as a table associating the gradation value with the luminance value is created. FIG. 14 is one example of the gradation luminance table. For example, it is understood from FIG. 14 that a luminance value corresponding to a gradation value "253" is "73.133" (candela per square meter). Hereinafter, when a luminance value is mentioned, the unit will be omitted.

Figures 17, 18:
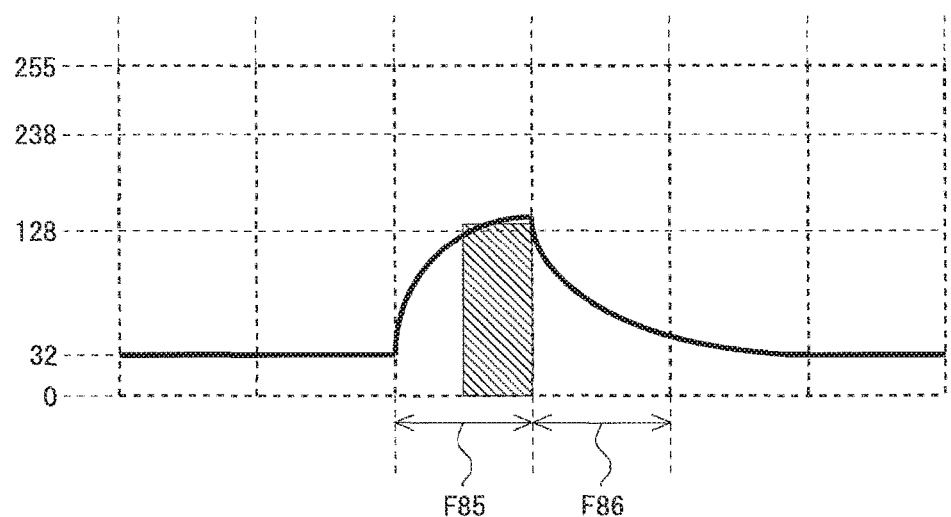
FIG. 17 is a diagram for describing the method of obtaining an application gradation value.
FIG. 18 is a diagram for describing the method of obtaining an application gradation value.

After creation of the gradation luminance table, parameters are obtained. Specifically, there are obtained parameters whose number is the same as the number of combinations of the liquid crystal state value at the end time of the previous field and the input gradation value in the display field. Here, a description will be given taking as an example a method of obtaining a parameter (application gradation value) corresponding to a combination that "the liquid crystal state value at the end time of the previous field is '32' and an input gradation value in the display field is '128'." Concerning this example, even if a voltage corresponding to the application gradation value "128" is applied to the liquid crystal panel in a given field from a state where the liquid crystal state value is "32", the liquid crystal state value does not attain "128" at the end time of the field as shown in FIG. 15. Thus, the luminance value in the field is greatly below the luminance value associated with the gradation value "128" in the gradation luminance table. Then, after setting of a state where the liquid crystal state value is "32" (i.e., a voltage corresponding to the liquid crystal state value "32" is applied to the liquid crystal panel), various values are used for the application gradation value in the field to be measured, to measure luminance values at the time of using the respective values. An application gradation value having obtained the closest value, out of the luminance values as thus measured, to the luminance value associated with the gradation value "128" in the foregoing gradation luminance table becomes a parameter corresponding to the combination that "the liquid crystal state value at the end time of the previous field is '32' and the input gradation value in the display field is '128'." For example, when the gradation luminance table is as shown in FIG. 16 and a result obtained by giving to the liquid crystal panel a voltage corresponding to each application gradation value from the state where the liquid crystal state value is "32" is as shown in FIG. 17, the parameter corresponding to the combination that "the liquid crystal state value at the end time of the previous field is '32' and the input gradation value in the display field is '128'" is "238" (see a row indicated by an arrow 80 in FIG. 16 and a row indicated by an arrow 81 in FIG. 17). It should be noted that a change in liquid crystal state value at the time of applying a voltage corresponding to the application gradation value "238" to the liquid crystal panel in a given field from the state where the liquid crystal state value is "32" is as shown in FIG. 18.

Figure 19:
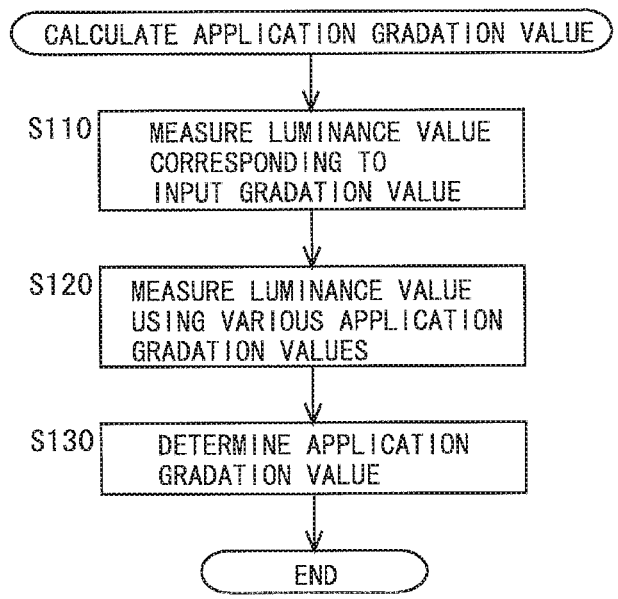
FIG. 19 is a flowchart showing a calculation procedure for an application gradation value.
Figures 22, 23:
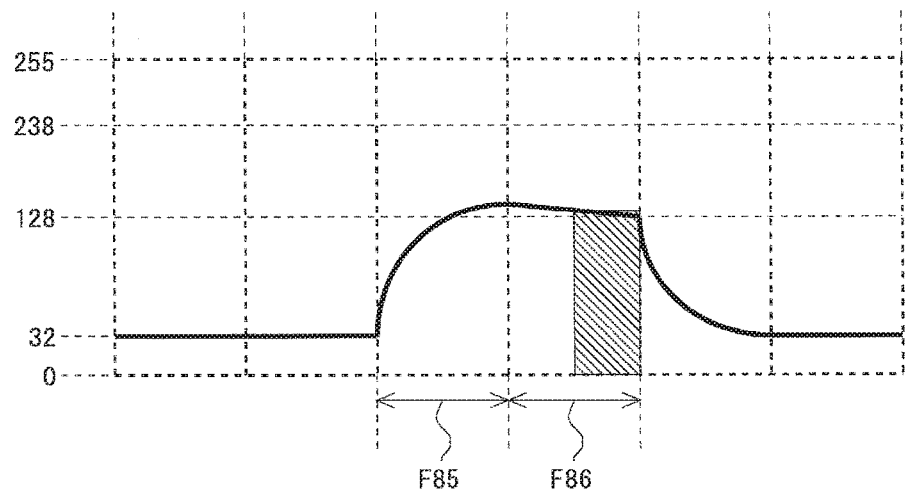
FIG. 22 is a diagram for describing a method of obtaining a liquid crystal state value.
FIG. 23 is a diagram for describing the method of obtaining a liquid crystal state value.
Figure 24:
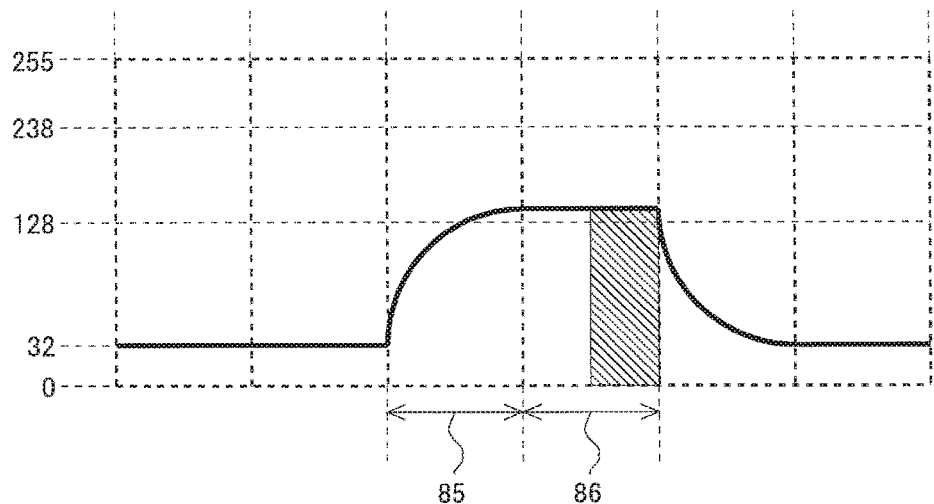
FIG. 24 is a diagram for describing the method of obtaining a liquid crystal state value.
Figure 25:
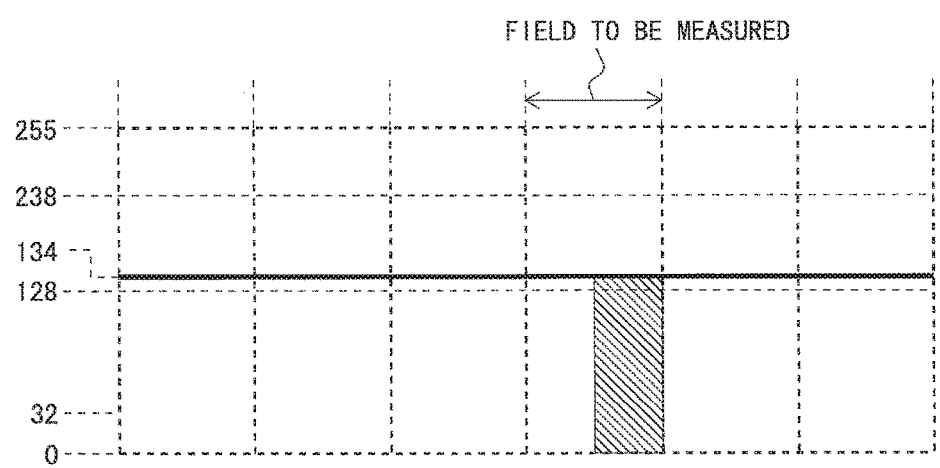
FIG. 25 is a diagram for describing the method of obtaining a liquid crystal state value.

Here, there will be summarized the method of obtaining the application gradation value (parameter) corresponding to the combination of the liquid crystal state value at the end time of the previous field and the input gradation value in the display field. FIG. 19 is a flowchart showing a calculation procedure for an application gradation value. First, a luminance value at the time of putting the backlight in the lighted state only for a predetermined period in a state where a voltage corresponding to the input gradation value in the display field is applied to the liquid crystal panel is measured (Step S110). Next, luminance values corresponding to respective gradation values (application gradation values) at the time of applying voltages corresponding to the variety of gradation values to the liquid crystal panel from the state where the voltage corresponding to the liquid crystal state value at the end time of the previous field has been applied to the liquid crystal panel, and putting the backlight in the lighted state only for a predetermined period, are measured (Step S120). Then, the closest luminance value to the luminance value measured in Step S110 is selected out of the luminance values measured in Step S120, to determine a gradation value corresponding to the selected luminance value as an application gradation value (parameter) to be calculated (Step S130).

In the above manner, there is obtained the application gradation value (parameter) corresponding to each combination of the liquid crystal state value at the end time of the previous field and the input gradation value in the display field. Thereby, a conversion table as shown in FIG. 20 (hereinafter referred to as an "application gradation value acquiring look-up table") is created. The application gradation value acquiring look-up table shown in FIG. 20 includes: a region 82 for storing a value associated with the input gradation value in the display field; a region 83 for storing a value associated with the liquid crystal state value at the end time of the previous field; and a region 84 for storing an application gradation value (parameter) corresponding to the combination of the input gradation value in the display field and the liquid crystal state value at the end time of the previous field. In the region 82 and the region 83, for example, values which increase by "32" are stored as shown in FIG. 21. In the region 84, application gradation values (parameters) obtained as described above are stored.

As described above, in the example shown in FIG. 21, values which increase by "32" are stored in the application gradation value acquiring look-up table, each as a value to be associated with the input gradation value in the display field or a value to be associated with the liquid crystal state value at the end time of the previous field. However, when a memory capacity is allowed to be increase, values which increase by "1" may be stored in the region 82 of FIG. 20 and the region 83 of FIG. 20. This also applies to a liquid crystal state value acquiring look-up table described later. Further, when values which increase by plural values are stored each as a value associated with the input gradation value in the display field or as a value associated with the liquid crystal state value at the end time of the previous field as in the example shown in FIG. 21, "an application gradation value in the display field" corresponding to a value not stored in the region 82 or a value not stored in the region 83 may be made obtainable by a linear interpolation process, for example. This also applies to a liquid crystal state value acquiring look-up table described later.

It should be noted that, although the description has been given assuming that one application gradation value acquiring look-up table is provided regardless of the number of fields constituting one frame period, the present invention is not limited thereto. For example, when each frame period includes the red field, the green field, and the blue field, the above measurement may be performed on each of the colors and three application gradation value acquiring look-up tables may be provided. Thereby, although cost increases since the circuit scale becomes large, it becomes possible to perform more accurate color display. This also applies to a liquid crystal state value acquiring look-up table described later.

<0.2.2 Method of Obtaining Liquid Crystal State Value>

In the present invention, the liquid crystal state value is used for obtaining the application gradation value. As described above, the liquid crystal state value at the end time of the display field is obtained based on the input gradation value in the display field and the liquid crystal state value at the end time of the previous field. For realizing this, the liquid crystal display device according to the present invention is provided with a conversion table that stores "a value associated with the input gradation value in the display field", "a value associated with the liquid crystal state value at the end time of the previous field", and "a liquid crystal state value corresponding to a combination of those values." Note that, in place of the conversion table, a process using an arithmetic expression for performing the same conversion may be performed. Hereinafter, a description will be given of how to obtain a liquid crystal state value (parameter) to be stored in the conversion table. Meanwhile, to obtain the liquid crystal state value at the end time of each field directly is difficult. Hence the liquid crystal state value at the end time of each field is estimated indirectly as described later. It should be noted that it is assumed that the foregoing gradation luminance table has already been created.

Here, a description will be given taking as an example a method of obtaining a parameter (liquid crystal state value) corresponding to a combination of "an input gradation value in the display field" is '128' and "a liquid crystal state value at the end time of the previous field is '32'." In the case of this example, as described above, the application gradation value in the display field is "238." When a voltage corresponding to the application gradation value "238" is applied to the liquid crystal panel in a given field from a state where the liquid crystal state value is "32, the liquid crystal state value changes as shown in FIG. 18. At this time, a luminance value corresponding to the gradation value "128" is obtained in the field. However, the liquid crystal state value has changed through the field, and a liquid crystal state value at the end time of the field (hereinafter referred to as a "field F85") is not "128." For this reason, even when a voltage corresponding to the application gradation value "128" is applied to the liquid crystal panel in the next field (hereinafter referred to as a "field F86"), a luminance value obtained in the field F86 is not a luminance value corresponding to the gradation value "128" (see FIG. 22). Here, the field F85 corresponds to the display field.

Then, various values are used for the application gradation value in the field F86, to measure a luminance value obtained in the field F86 when each of the values is used. It should be noted that, in the field F86, the backlight is lighted only for a period depending on a duty cycle assumed in the target liquid crystal display device. Thus, as in a table denoted by reference character R1 in FIG. 23, a luminance value corresponding to each application gradation value used for measurement is obtained. Further, as in a table denoted by reference character R2 in FIG. 23, a luminance value corresponding to each gradation value is stored in the foregoing gradation luminance table. Then, a gradation value with which the luminance value in the table denoted by reference character R1 and the luminance value in the table denoted by reference character R2 become values closest to each other out of all the gradation values is estimated as "the liquid crystal state value at the end time of the display field" in the case where "the input gradation value in the display field is '128' and the liquid crystal state value at the end time of the previous field is '32'." In the example shown in FIG. 23, the parameter corresponding to the combination of "the input gradation value in the display field is '128' and the liquid crystal state value at the end time of the previous field is '32'" is "134" (see a row indicated by an arrow 87 and a row indicated by an arrow 88 in FIG. 23).

It should be noted that the above example means that the following luminance values coincide with each other: "a luminance value that is obtained when the application gradation value in the field F85 is set to "238" from the state where the liquid crystal state value is "32", the application gradation value in the field F86, which is the next field, is set to "134", and the backlight is lighted only in the field F86" (see FIG. 24); and "a luminance value that is obtained when the application gradation value in every field is set to "134" and the backlight is lighted only in the field to be measured" (see FIG. 25).

Figures 26, 27:
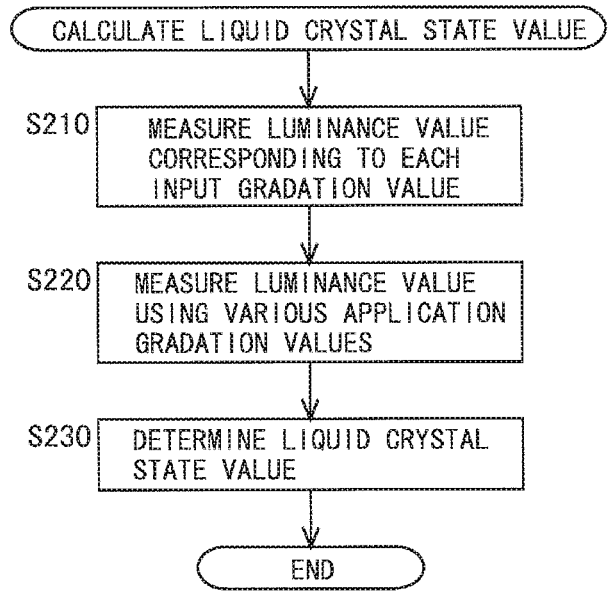
FIG. 26 is a flowchart showing a calculation procedure for a liquid crystal state value.
FIG. 27 is one example of the liquid crystal state value acquiring look-up table.

Here, there will be summarized the method of obtaining the liquid crystal state value (parameter) corresponding to the combination of the liquid crystal state value at the end time of the previous field and the input gradation value in the display field. FIG. 26 is a flowchart showing a calculation procedure for a liquid crystal state value. First, a luminance value corresponding to each gradation value at the time of putting the backlight in the lighted state only for a predetermined period in a state where a voltage corresponding to each gradation value is applied to the liquid crystal panel is measured (Step S210). Next, luminance values corresponding to respective gradation values at the time of applying voltages corresponding to the variety of gradation values to the liquid crystal panel and putting the backlight in the lighted state only for a predetermined period are measured, after a voltage corresponding to the input gradation value in the display field is applied to the liquid crystal panel from the state where the voltage corresponding to the liquid crystal state value at the end time of the previous field has been applied to the liquid crystal panel (Step S220). Then, a gradation value, out of all the gradation values, with which the luminance value obtained in Step S210 and the luminance value obtained in Step S220 become values closest to each other is determined as a liquid crystal state value (parameter) to be calculated (Step S230).

In the above manner, there is estimated the liquid crystal state value (parameter) corresponding to the combination of the input gradation value in the display field and the liquid crystal state value at the end time of the previous field. Thereby, a conversion table as shown in FIG. 27 (hereinafter referred to as a "liquid crystal state value acquiring look-up table") is created. Note that numerical values in the liquid crystal state value acquiring look-up table shown in FIG. 27 are one example. The format of the liquid crystal state value acquiring look-up table is the same as the format of the foregoing application gradation value acquiring look-up table (see FIG. 20). That is, liquid crystal state value acquiring look-up table includes: a region for storing a value associated with the input gradation value in the display field; a region for storing a value associated with the liquid crystal state value at the end time of the previous field; and a region for storing a liquid crystal state value (parameter) corresponding to the combination of the input gradation value in the display field and the liquid crystal state value at the end time of the previous field.

Based on the above description, embodiments of the present invention will be described below with reference to the accompanying drawings.

<1. First Embodiment>
<1.1 Overall Configuration and Summary of Operation>

Figure 28:
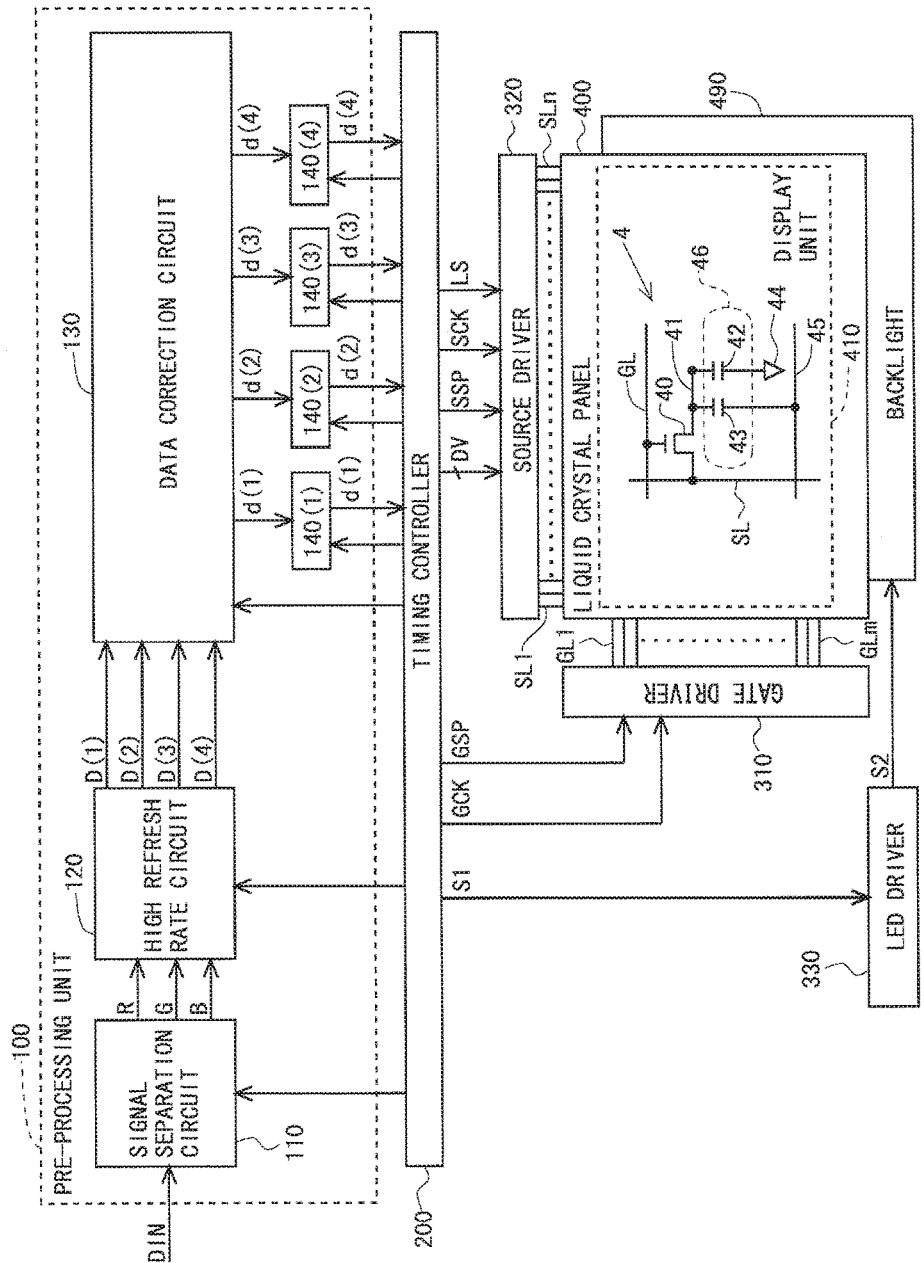
FIG. 28 is a block diagram showing an overall configuration of the liquid crystal display device according to the first embodiment.

FIG. 28 is a block diagram showing an overall configuration of a liquid crystal display device according to a first embodiment of the present invention. The liquid crystal display device is configured by a pre-processing unit 100, a timing controller 200, a gate driver 310, a source driver 320, an LED driver 330, a liquid crystal panel 400, and a backlight 490. Note that the gate driver 310, the source driver 320, or both of the drivers may be provided in the liquid crystal panel 400. The liquid crystal panel 400 includes a display unit 410 that displays an image. The pre-processing unit 100 includes a signal separation circuit 110, a high refresh rate circuit 120, a data correction circuit 130, and first to fourth field memories 140(1) to (4). In the present embodiment, an LED (light-emitting diode) is adopted as a light source of the backlight 490. Specifically, red LEDs, green LEDs, and blue LEDs constitute a backlight 490. It should be noted that, in the present embodiment, a liquid crystal panel driving unit is realized by the timing controller 200, the gate driver 310, and the source driver 320, and the backlight driving unit is realized by the LED driver 330. Further, the input image data separating unit is realized by the signal separation circuit 110.

The liquid crystal display device according to the present embodiment has employed the field sequential system. That is, the backlight 490 is lighted in a different lighting pattern in every field. In the present embodiment, the following lighting patterns are prepared: a first lighting pattern in which only the red LED is in the lighted state; a second lighting pattern in which only the green LED is in the lighted state; and a third lighting pattern in which only the blue LED is in the lighted state. In each field, the backlight 490 is lighted in any lighting pattern of the first to third lighting patterns. The lighting pattern that appears in each field repeatedly changes in the order of "the first lighting pattern, the second lighting pattern, and the third lighting pattern." Accordingly, in the present embodiment, a red screen, a green screen, and a blue screen are repeatedly displayed during the operation of the liquid crystal display device. Hence a desired color image is displayed on the display unit 410. Note that the frame frequency of the liquid crystal display device according to the present embodiment is assumed to be 60 Hz.

Figure 29:
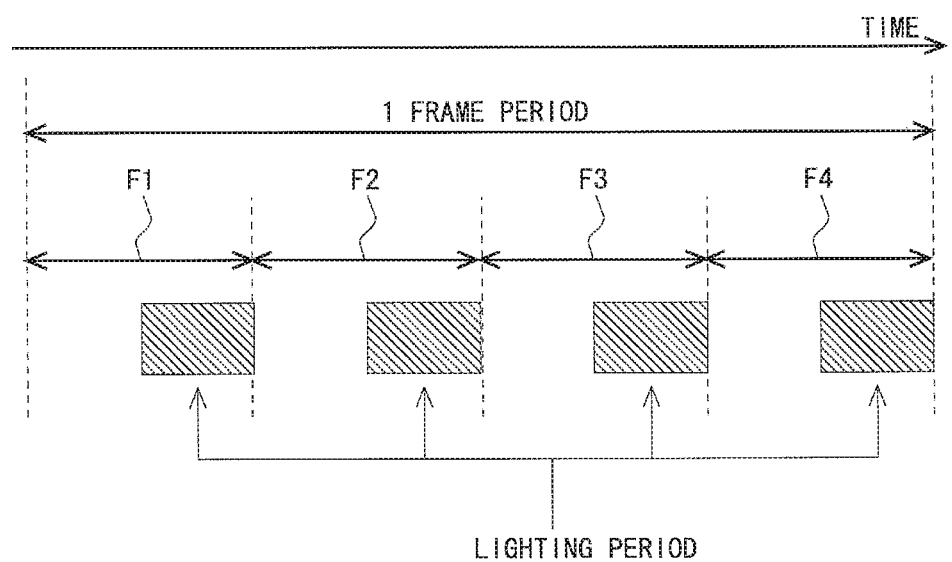
FIG. 29 is a diagram showing a configuration of one frame period in the first embodiment.

FIG. 29 is a diagram showing a configuration of one frame period in the present embodiment. As shown in FIG. 29, one frame period includes four fields (first to fourth fields F1 to F4). In this manner, in the present embodiment, one frame period is divided into four fields while the three lighting patterns are prepared. As described above, the lighting pattern that appears in each field repeatedly changes in the order of "the first lighting pattern, the second lighting pattern, and the third lighting pattern." Accordingly, the order of the lighting patterns that appear within one frame period changes in every frame. In each field, after the lapse of a predetermined period from the field start time, the backlight 490 is lighted depending on the lighting pattern. Note that the length of the period in which the backlight is in the lighted state in each field may be determined in view of response characteristics of the liquid crystal.

Concerning FIG. 28, the display unit 410 is provided with a plurality of (n) source bus lines (video signal lines) SL1 to SLn and a plurality of (m) gate bus lines (scanning signal lines) GL1 to GLm. A pixel formation portion 4 for forming a pixel is provided so as to correspond to each of intersections between the source bus lines SL1 to SLn and the gate bus lines GL1 to GLm. That is, the display unit 410 includes a plurality of (n×m) pixel formation portions 4. The plurality of pixel formation portions 4 are arranged in a matrix form to constitute a pixel matrix with m rows and n columns. Each pixel formation portion 4 includes: a thin film transistor (TFT) 40 which is a switching element having a gate terminal (control terminal) connected to a gate bus line GL that passes through a corresponding intersection, and having a source terminal (first conductive terminal) connected to a source bus line SL that passes through the intersection; a pixel electrode 41 connected to a drain terminal (second conductive terminal) of the TFT 40; a common electrode 44 and an auxiliary capacitance electrode 45 which are provided so as to be shared by the plurality of pixel formation portions 4; a liquid crystal capacitance 42 formed of the pixel electrode 41 and the common electrode 44; and an auxiliary capacitance 43 formed of the pixel electrode 41 and the auxiliary capacitance electrode 45. The liquid crystal capacitance 42 and the auxiliary capacitance 43 constitutes a pixel capacitance 46. Note that only constituents corresponding to one pixel formation portion 4 is shown in the display unit 410 in FIG. 28.

Meanwhile, as the TFT 40 in the display unit 410, for example, an oxide TFT (a thin film transistor using an oxide semiconductor for a channel layer) can be adopted. More specifically, a TFT with a channel layer formed of In—Ga—Zn—O (indium gallium zinc oxide) (hereinafter, referred to as "In—Ga—Zn—O-TFT"), which is an oxide semiconductor including indium (In), gallium (Ga), zinc (Zn), and oxygen (O) as main components, can be adopted as the TFT 40. By adopting such an In—Ga—Zn—O-TFT, it is possible to make a writing speed higher than in the conventional case in addition to obtaining the effect of higher definition and lower power consumption. It is also possible to adopt a transistor using an oxide semiconductor other than In—Ga—Zn—O (indium gallium zinc oxide) for the channel layer. For example, the same effect can be obtained even in the case of adopting a transistor using, for the channel layer, an oxide semiconductor containing at least one of indium, gallium, zinc, copper (Cu), silicon (Si), tin (Sn), aluminum (Al), calcium (Ca), germanium (Ge), and lead (Pb). Note that the present invention is not to exclude the use of a TFT other than the oxide TFT.

Next, operations of the constituents shown in FIG. 28 will be described. The signal separation circuit 110 in the pre-processing unit 100 separates an input image signal DIN transmitted from the outside into input gradation data for the first lighting pattern, input gradation data for the second lighting pattern, and input gradation data for the third lighting pattern. In the present embodiment, specifically, the signal separation circuit 110 in the pre-processing unit 100 separates the input image signal DIN transmitted from the outside into red input gradation data R, green input gradation data G, and blue input gradation data B.

The high refresh rate circuit 120 in the pre-processing unit 100 divides one frame period into four fields, and converts the input gradation data for each lighting pattern to the input gradation data for each field by allocating the input gradation data (red input gradation data R, green input gradation data G, blue input gradation data B) obtained by the signal separation circuit 110 to the four fields such that a cycle in which the same lighting pattern appears is shorter than a cycle in which the input image signal DIN for one frame period (for one screen) is inputted. Thereby, input gradation data D(1) for the first field, input gradation data D(2) for the second field, input gradation data D(3) for the third field, and input gradation data D(4) for the fourth field are outputted from the high refresh rate circuit 120. Note that a detailed description of the high refresh rate circuit 120 will be described later.

The data correction circuit 130 in the pre-processing unit 100 corrects the input gradation data (the input gradation data D(1) to D(4) for the first to fourth fields) outputted from the high refresh rate circuit 120 to data associated with a voltage to be applied to the liquid crystal panel 400. The data correction circuit 130 then outputs the data after correction as application gradation data (application gradation data d(1) to d(4) for the first to fourth fields). Note that a detailed description of the data correction circuit 130 will be described later.

The application gradation data d(1) to d(4) for the first to fourth fields outputted from the data correction circuit 130 are respectively stored into the first to fourth field memories 140(1) to (4).

The timing controller 200 reads the application gradation data d(1) to d(4) for the first to fourth fields from the first to fourth field memories 140(1) to (4), respectively, and outputs a digital video signal DV, a gate start pulse signal GSP and a gate clock signal GCK which are for controlling the operation of the gate driver 310, a source start pulse signal SSP, a source clock signal SCK, and a latch strobe signal LS which are for controlling the operation of the source driver 320, and an LED driver control signal S1 for controlling the operation of the LED driver 330.

The gate driver 310 repeats application of an active scanning signal to each gate bus line GL based on the gate start pulse signal GSP and the gate clock signal GCK which are transmitted from the timing controller 200, with one vertical scanning period taken as a cycle.

The source driver 320 receives the digital video signal DV, the source start pulse signal SSP, the source clock signal SCK, and the latch strobe signal LS which have been transmitted from the timing controller 200, and applies a driving video signal to each source bus lines SL. At this time, the digital video signal DV indicating a voltage to be applied to each source bus line SL is sequentially held at the timing when a pulse of the source clock signal SCK is generated, in the source driver 320. Then, the held digital video signal DV is converted to an analog voltage at the timing when a pulse of the latch strobe signal LS is generated. The converted analog voltages are applied together as driving video signals to all of the source bus lines SL1 to SLn.

The LED driver 330 outputs a light source control signal S2 for controlling the state of each LED constituting the backlight 490 based on the LED driver control signal S1 transmitted from the timing controller 200. The backlight 490 appropriately performs switching of the lighting pattern, namely switching of the state of each LED (switching between the lighted state and the unlighted state), based on the light source control signal S2.

In the above manner, the scanning signals are applied to the gate bus lines GL1 to GLm, the driving video signals are applied to the source bus lines SL1 to SLn, and the state of each LED is switched appropriately. Thereby, an image depending on the input image signal DIN is displayed on the display unit 410 of the liquid crystal panel 400.

<1.2 High Refresh Rate Circuit>

Figure 30:
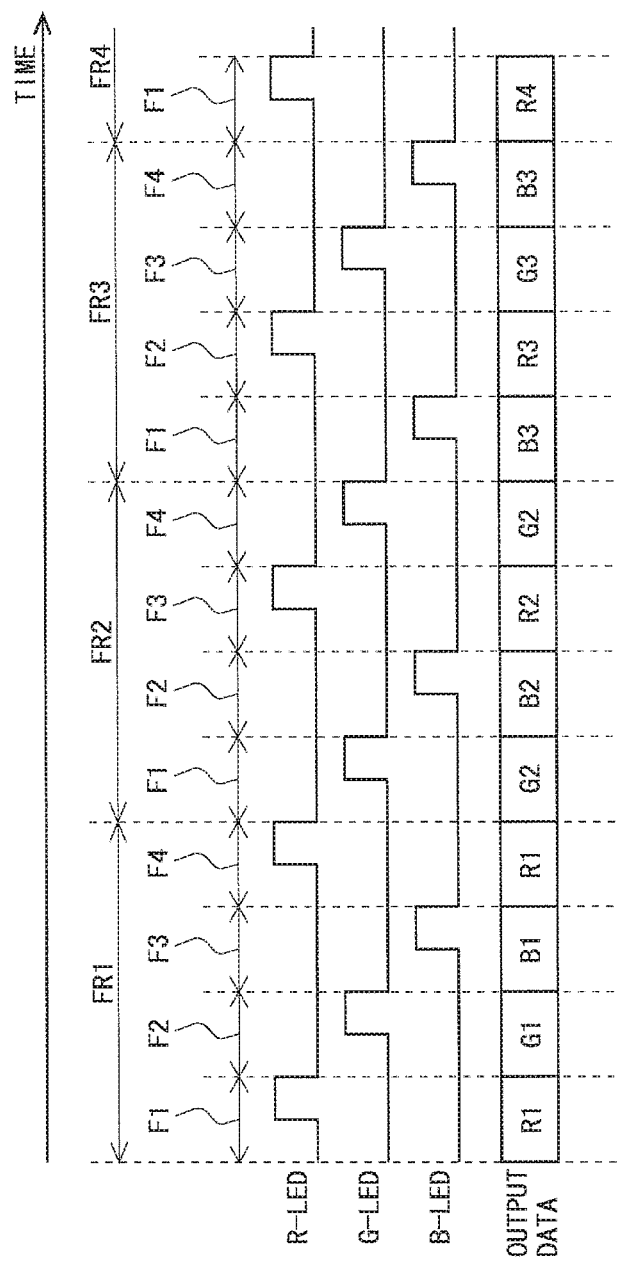
FIG. 30 is a diagram for describing a process performed by a high refresh rate circuit in the first embodiment.

Next, with reference to FIG. 30, a description will be given of specifically how the high refresh rate circuit 120 converts the input gradation data for each lighting pattern to the input gradation data for each field in the present embodiment. FIG. 30 is a diagram showing the relationship of the field, the lighting pattern, and the output data during given three frame periods. In FIG. 30, a field in which only the R-LED (red LED) is ON is the field set to the first lighting pattern, a field in which only the G-LED (green LED) is ON is the field set to the second lighting pattern, and a field in which only the B-LED (blue LED) is ON is the field set to the third lighting pattern. As for sections of output data in FIG. 30, "Rj" represents red input gradation data obtained by the input image signal DIN in a jth frame, "Gj" represents green input gradation data obtained by the input image signal DIN in the jth frame, "Bj" represents blue input gradation data obtained by the input image signal DIN in the jth frame.

The high refresh rate circuit 120 receives, from the signal separation circuit 110, the red input gradation data, the green input gradation data, and the blue input gradation data which have been obtained from the input image signals DIN of the respective frames, and allocates these pieces of data as input gradation data for the respective fields as follows. Note that the following description means, for example, that "the red input gradation data R1 is allocated to the input gradation data D(1) for the first field in the first frame."

First Frame
  input gradation data D(1) for first field: red input gradation data R1
  input gradation data D(2) for second field: green input gradation data G1
  input gradation data D(3) for third field: blue input gradation data B1
  input gradation data D(4) for fourth field: red input gradation data R1

Second Frame
  input gradation data D(1) for first field: green input gradation data G2
  input gradation data D(2) for second field: blue input gradation data B2
  input gradation data D(3) for third field: red input gradation data R2
  input gradation data D(4) for fourth field: green input gradation data G2

Third Frame
  input gradation data D(1) for first field: blue input gradation data B3
  input gradation data D(2) for second field: red input gradation data R3
  input gradation data D(3) for third field: green input gradation data G3
  input gradation data D(4) for fourth field: blue input gradation data B3

Figure 31:
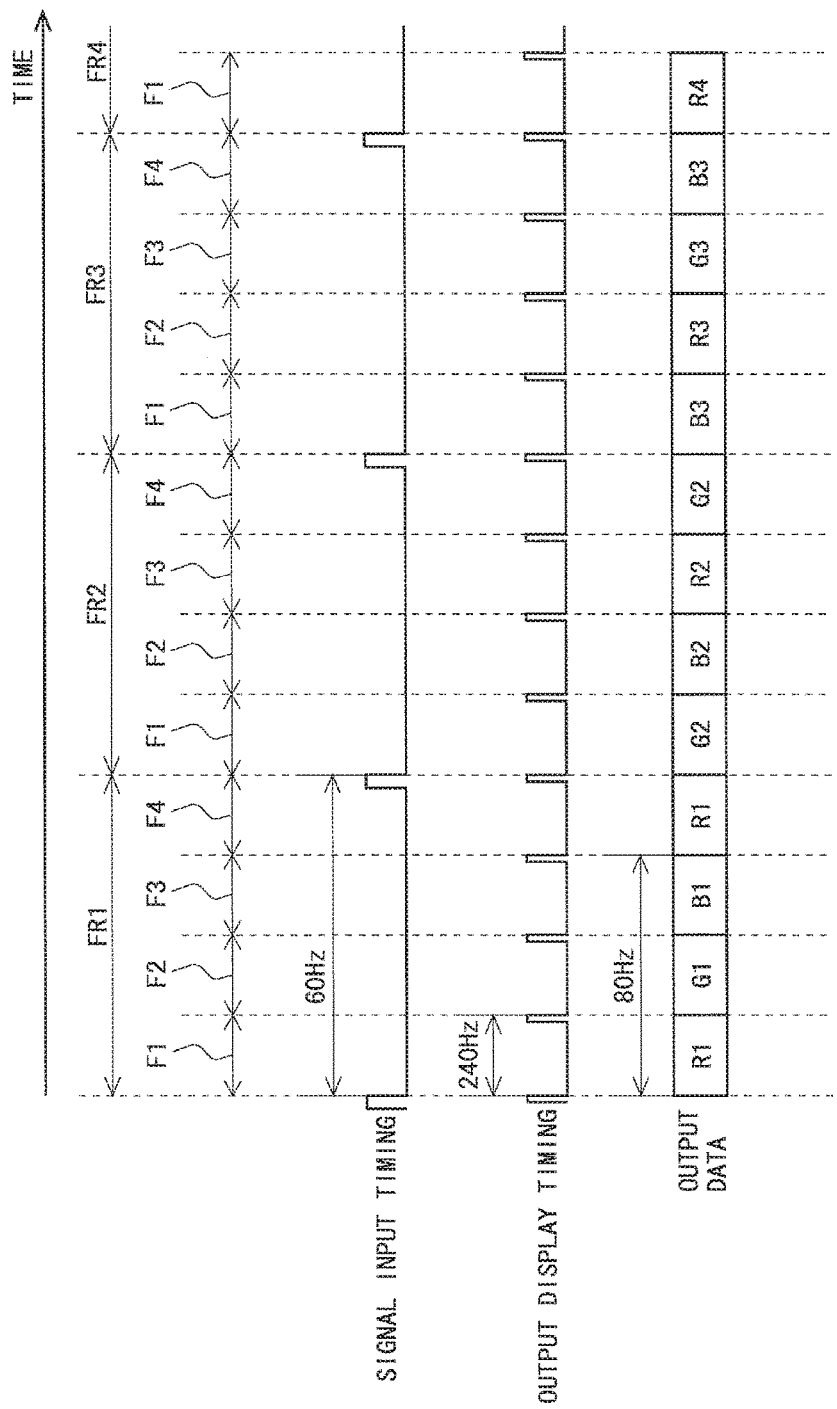
FIG. 31 is a diagram for describing the process performed by the high refresh rate circuit in the first embodiment.

In the present embodiment, the allocation of data as thus described is repeated taking three frames as a cycle. Here, since the frame frequency in the present embodiment is 60 Hz and one frame period is divided into four fields, the drive frequency of the overall light source is 240 Hz. While one frame period is divided into four fields, data is allocated as described above, and hence a screen of the same color (a screen of a color based on the same lighting pattern) is displayed every three fields. Accordingly, the frequency of the luminance change based on each lighting pattern is 80 Hz (see FIG. 31).

<1.3 Data Correction Circuit>

Figure 1:
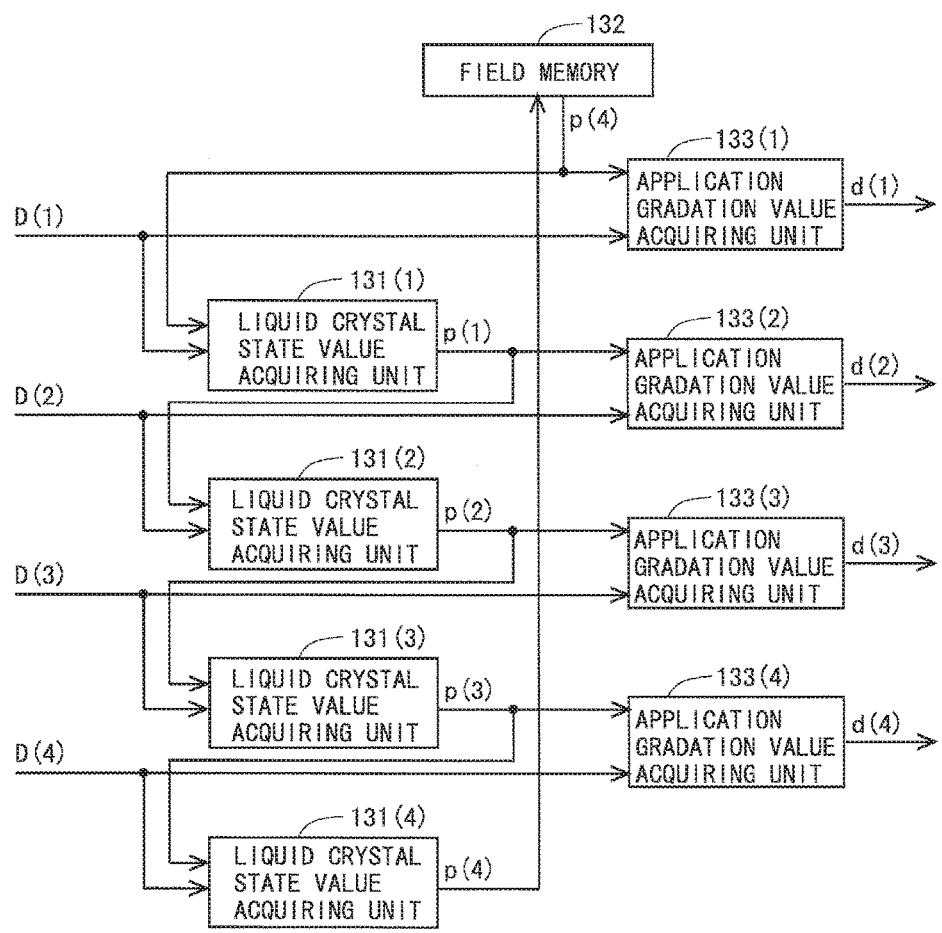
FIG. 1 is a block diagram showing a detailed configuration of a data correction circuit of a liquid crystal display device according to a first embodiment of the present invention.

Next, a detailed configuration and operation of the data correction circuit 130 will be described in detail. FIG. 1 is a block diagram showing a detailed configuration of the data correction circuit 130 in the present embodiment. The data correction circuit 130 is configured by: a first-field liquid crystal state value acquiring unit 131(1); a second-field liquid crystal state value acquiring unit 131(2); a third-field liquid crystal state value acquiring unit 131(3); a fourth-field liquid crystal state value acquiring unit 131(4); a field memory 132, a first-field application gradation value acquiring unit 133(1); a second-field application gradation value acquiring unit 133(2); a third-field application gradation value acquiring unit 133(3); and a fourth-field application gradation value acquiring unit 133(4). Hereinafter, the first to fourth-field liquid crystal state value acquiring units 131(1) to 131(4) are also generically simply referred to as "liquid crystal state value acquiring unit." Reference character 131 is provided to the liquid crystal state value acquiring unit. Hereinafter, the first to fourth-field application gradation value acquiring units 133(1) to 133(4) are also generically simply referred to as "application gradation value acquiring unit." Reference character 133 is provided to the application gradation value acquiring unit. Also in FIG. 1, the first to fourth-field liquid crystal state value acquiring units are simply referred to as the "liquid crystal state value acquiring unit", and the first to fourth-field application gradation value acquiring units are simply referred to as the "application gradation value acquiring unit."

The liquid crystal state value acquiring unit 131 has the foregoing liquid crystal state value acquiring look-up table. Based on an input gradation value (a value of input gradation data) in the display field and a liquid crystal state value at the end time of the previous field (a field one field before the display field), the liquid crystal state value acquiring unit 131 obtains a liquid crystal state value at the end time of the display field. Data representing the liquid crystal state value obtained by the liquid crystal state value acquiring unit 131 is outputted as liquid crystal state data from the liquid crystal state value acquiring unit 131. The field memory 132 holds, for one frame period, liquid crystal state data p(4) outputted from the fourth-field liquid crystal state value acquiring unit 131(4) corresponding to the fourth field F4 which is the last field of one frame period. The liquid crystal state data p(4) stored into this field memory 132 in each frame is used by the first-field liquid crystal state value acquiring unit 131(1) in the next frame. The application gradation value acquiring unit 133 has the foregoing application gradation value acquiring look-up table, and obtains an application gradation value in the display field based on the input gradation value in the display field and the liquid crystal state value at the end time of the previous field. Hereinafter, the liquid crystal state value acquiring unit 131 and the application gradation value acquiring unit 133 will be described in detail.

<1.3.1. Liquid Crystal State Value Acquiring Unit>

In each frame, the first-field liquid crystal state value acquiring unit 131(1) outputs liquid crystal state data p(1) representing a liquid crystal state value at the end time of the first field F1 based on the input gradation data D(1) for the first field and the liquid crystal state data (data representing the liquid crystal state value at the end time of the fourth field F4 in the frame that is one frame before) p(4) stored in the field memory 132. In each frame, the second-field liquid crystal state value acquiring unit 131(2) outputs liquid crystal state data p(2) representing a liquid crystal state value at the end time of the second field F2 based on the input gradation data D(2) for the second field and the liquid crystal state data (data representing the liquid crystal state value at the end time of the first field F1) p(1) outputted from the first-field liquid crystal state value acquiring unit 131(1). Similarly, in each frame, the third-field liquid crystal state value acquiring unit 131(3) outputs liquid crystal state data p(3) representing a liquid crystal state value at the end time of the third field F3, and in each frame, the fourth-field liquid crystal state value acquiring unit 131(4) outputs liquid crystal state data p(4) representing a liquid crystal state value at the end time of the fourth field F4.

Figure 32:
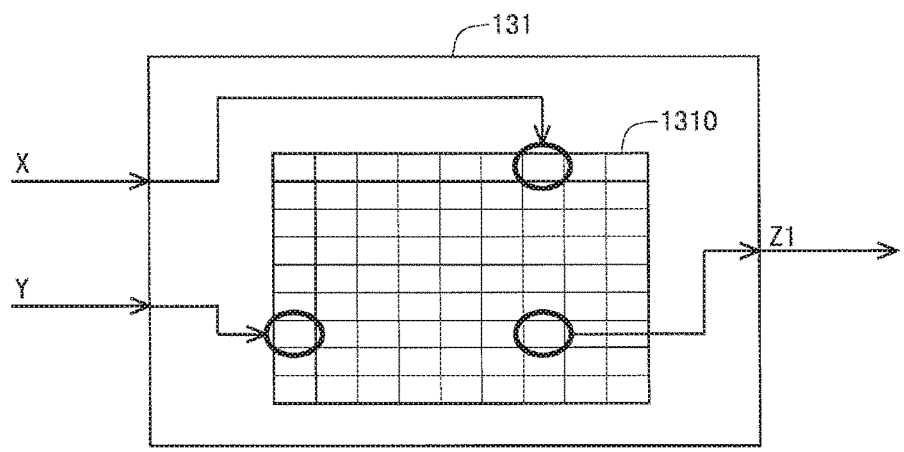
FIG. 32 is a diagram for describing the liquid crystal state value acquiring look-up table in the first embodiment.

In the present embodiment, each liquid crystal state value acquiring unit 131 is provided with a liquid crystal state value acquiring look-up table 1310 which stores "a value associated with the input gradation value in the display field", "a value associated with the liquid crystal state value at the end time of the previous field", and "a liquid crystal state value corresponding to a combination of those values." Then, as shown in FIG. 32, a value associated with a combination of an input gradation value X in the display field and a liquid crystal state value Y at the end time of the previous field in the liquid crystal state value acquiring look-up table is taken as a liquid crystal state value Z1 at the end time of the display field.

By provision of the liquid crystal state value acquiring unit 131 with the above configuration, in the present embodiment, the liquid crystal state value at the end time of each of the first to fourth fields F1 to F4 is obtained considering a change in liquid crystal state in every field in the past.

<1.3.2 Application Gradation Value Acquiring Unit>

In each frame, the first-field application gradation value acquiring unit 133(1) outputs application gradation data d(1) for the first field based on the input gradation data D(1) for the first field and the liquid crystal state data (data representing the liquid crystal state value at the end time of the fourth field F4 in the frame that is one frame before) p(4) stored in the field memory 132. In each frame, the second-field application gradation value acquiring unit 133(2) outputs application gradation data d(2) for the second field based on the input gradation data D(2) for the second field and the liquid crystal state data (data representing the liquid crystal state value at the end time of the first field F1) p(1) outputted from the first-field liquid crystal state value acquiring unit 131(1). Similarly, in each frame, the third-field application gradation value acquiring unit 133(3) outputs application gradation data d(3) for the third field, and in each frame, the fourth-field application gradation value acquiring unit 133(4) outputs application gradation data d(4) for the fourth field.

Figure 33:
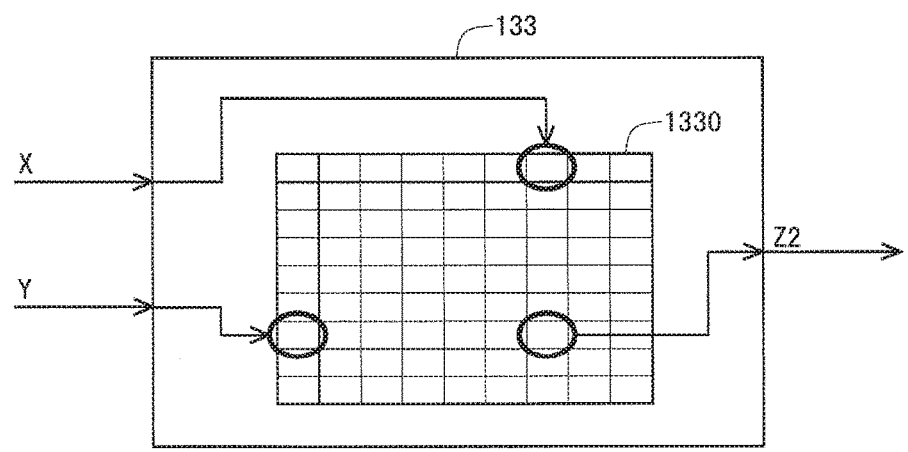
FIG. 33 is a diagram for describing the liquid crystal state value acquiring look-up table in the first embodiment.

In the present embodiment, each application gradation value acquiring unit 133 is provided with an application gradation value acquiring look-up table 1330 which stores "a value associated with the input gradation value in the display field", "a value associated with the liquid crystal state value at the end time of the previous field", and "an application gradation value corresponding to a combination of those values." Then, as shown in FIG. 33, a value associated with a combination of an input gradation value X in the display field and a liquid crystal state value Y at the end time of the previous field in the application gradation value acquiring look-up table 1330 is taken as an application gradation value Z2 in the display field.

By provision of the application gradation value acquiring unit 133 with the above configuration, in the present embodiment, the application gradation value at the end time of each of the first to fourth fields F1 to F4 is obtained considering the liquid crystal state at the end time of the field that is one field before.

<1.4 Effects>

The liquid crystal display device employing the field sequential system according to the present embodiment is provided with: the liquid crystal state value acquiring unit 131 configured to obtain a liquid crystal state value at the end time of the display field based on an input gradation value in the display field and a liquid crystal state value at the end time of the previous field (a field one field before the display field); and the application gradation value acquiring unit 133 configured to obtain an application gradation value in the display field by correcting an input gradation value in the display field based on a liquid crystal state value at the end time of the previous field. It is thus possible to make a correction that emphasizes a temporal change in data value on the input image signal DIN such that an integral value of luminance in the backlight lighting period becomes target display luminance, while considering a change in liquid crystal state in every field in the past. Hence it is possible to obtain desired display luminance in each field even when the liquid crystal state changes during the lighting period of the backlight 490. As a result, the occurrence of color shift is prevented. Further, in the present embodiment, while the three lighting patterns are prepared as the lighting pattern of the backlight 490, one frame period is divided into four fields by the high refresh rate circuit 120. During the operation of the liquid crystal display device, the three lighting patterns repeatedly appear in predetermined order while the lighting pattern is switched in every field. Hence the frequency of the luminance change based on each lighting pattern is 80 Hz. That is, display at a refresh rate (update frequency) of 80 Hz is apparently performed. As a result, the occurrence of flicker is prevented. Accordingly, according to the present embodiment, there is realized the liquid crystal display device employing the field sequential system which is capable of preventing the occurrence of color shift and flicker.

<2. Second Embodiment>

<2.1 Summary>

According to the first embodiment, the frequency of the luminance change based on each lighting pattern has been 80 Hz. However, even when the frequency of the luminance change is 80 Hz, some observers perceive flicker. Hence in the present embodiment, in the configuration in which the three lighting patterns are prepared, one frame period is divided into five fields.

Figure 34:
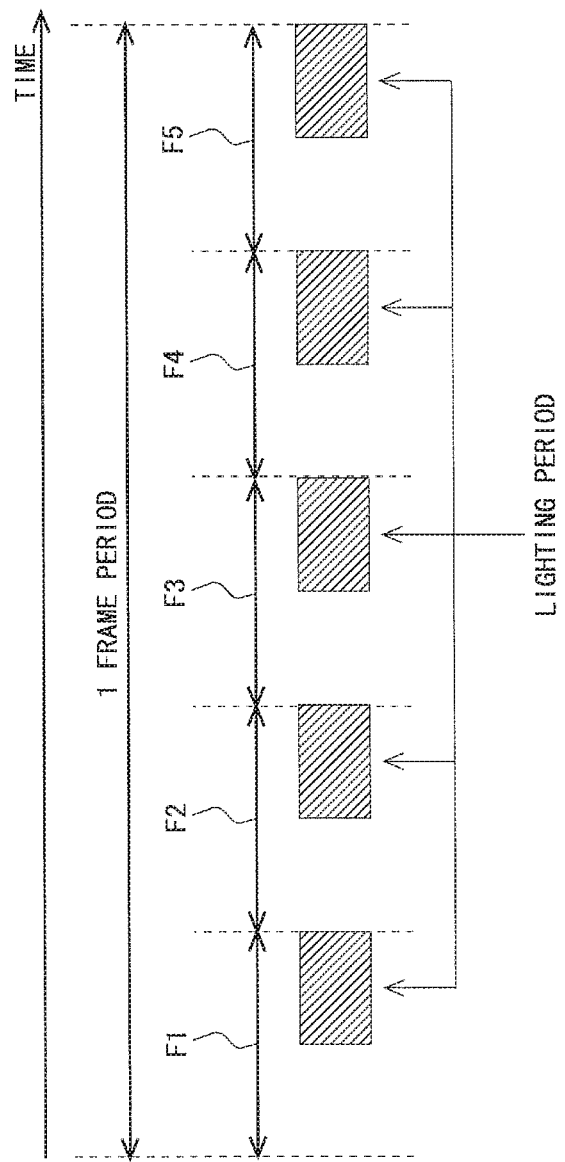
FIG. 34 is a diagram showing a configuration of one frame period in a second embodiment of the present invention.

FIG. 34 is a diagram showing a configuration of one frame period in the present embodiment. As shown in FIG. 34, one frame period includes five fields (first to fifth fields F1 to F5). The lighting pattern that appears in each field repeatedly changes in the order of "the first lighting pattern, the second lighting pattern, and the third lighting pattern." In each field, after the lapse of a predetermined period from the field start time, the backlight 490 is lighted depending on the lighting pattern.

<2.2 Configuration>

Figure 35:
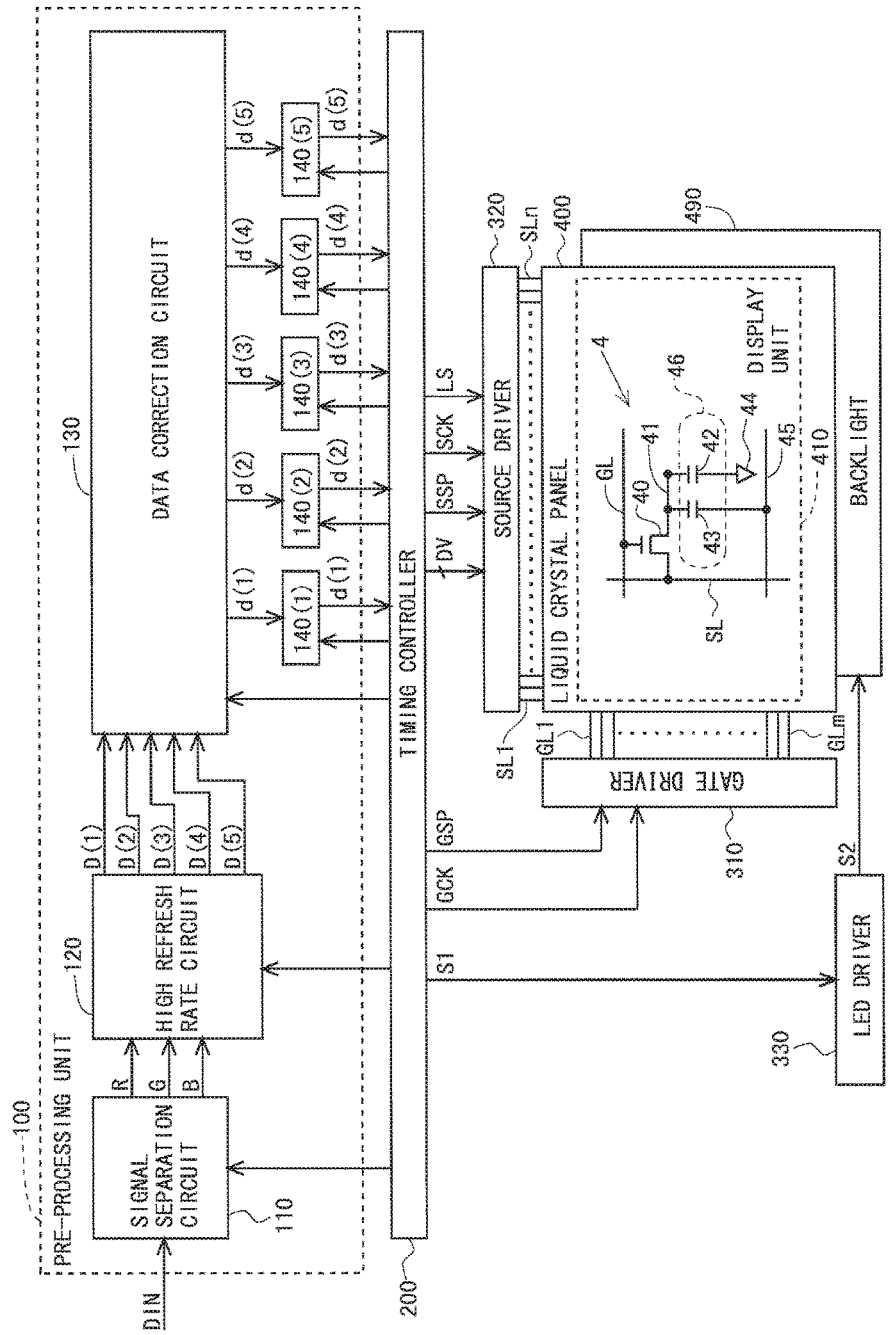
FIG. 35 is a block diagram showing an overall configuration of a liquid crystal display device according to the second embodiment.

FIG. 35 is a block diagram showing an overall configuration of a liquid crystal display device according to the second embodiment of the present invention. In the present embodiment, the configuration of the pre-processing unit 100 is different from the configuration in the first embodiment (see FIG. 28). In the pre-processing unit 100 of the present embodiment, a fifth field memory 140(5) is provided in addition to the constituents in the first embodiment. Further, data outputted from the high refresh rate circuit 120 is different from that in the first embodiment. Hereinafter, detailed descriptions of the same points as those of the first embodiment will be omitted.

In the same manner as in the first embodiment, the signal separation circuit 110 in the pre-processing unit 100 separates the input image signal DIN transmitted from the outside into red input gradation data R, green input gradation data G, and blue input gradation data B.

The high refresh rate circuit 120 in the pre-processing unit 100 divides one frame period into five fields, and converts the input gradation data for each lighting pattern to the input gradation data for each field by allocating the input gradation data (red input gradation data R, green input gradation data G, blue input gradation data B) obtained by the signal separation circuit 110 to the five fields such that a cycle in which the same lighting pattern appears is shorter than a cycle in which the input image signal DIN for one frame period (for one screen) is inputted. With the three lighting patterns prepared, a process of allocating the three kinds of input gradation data to the five fields is performed. Thereby, input gradation data D(1) for the first field, input gradation data D(2) for the second field, input gradation data D(3) for the third field, input gradation data D(4) for the fourth field, and input gradation data D(5) for the fifth field are outputted from the high refresh rate circuit 120.

The data correction circuit 130 in the pre-processing unit 100 corrects the input gradation data (the input gradation data D(1) to D(5) for the first to fifth fields) outputted from the high refresh rate circuit 120 to data associated with a voltage to be applied to the liquid crystal panel 400. The data correction circuit 130 then outputs the data after correction as application gradation data (application gradation data d(1) to d(5) for the first to fifth fields).

In the first to fifth field memories 140(1) to (5), the application gradation data d(1) to d(5) for the first to fifth fields outputted from the data correction circuit 130 are stored respectively.

<2.3 High Refresh Rate Circuit>

Figure 36:
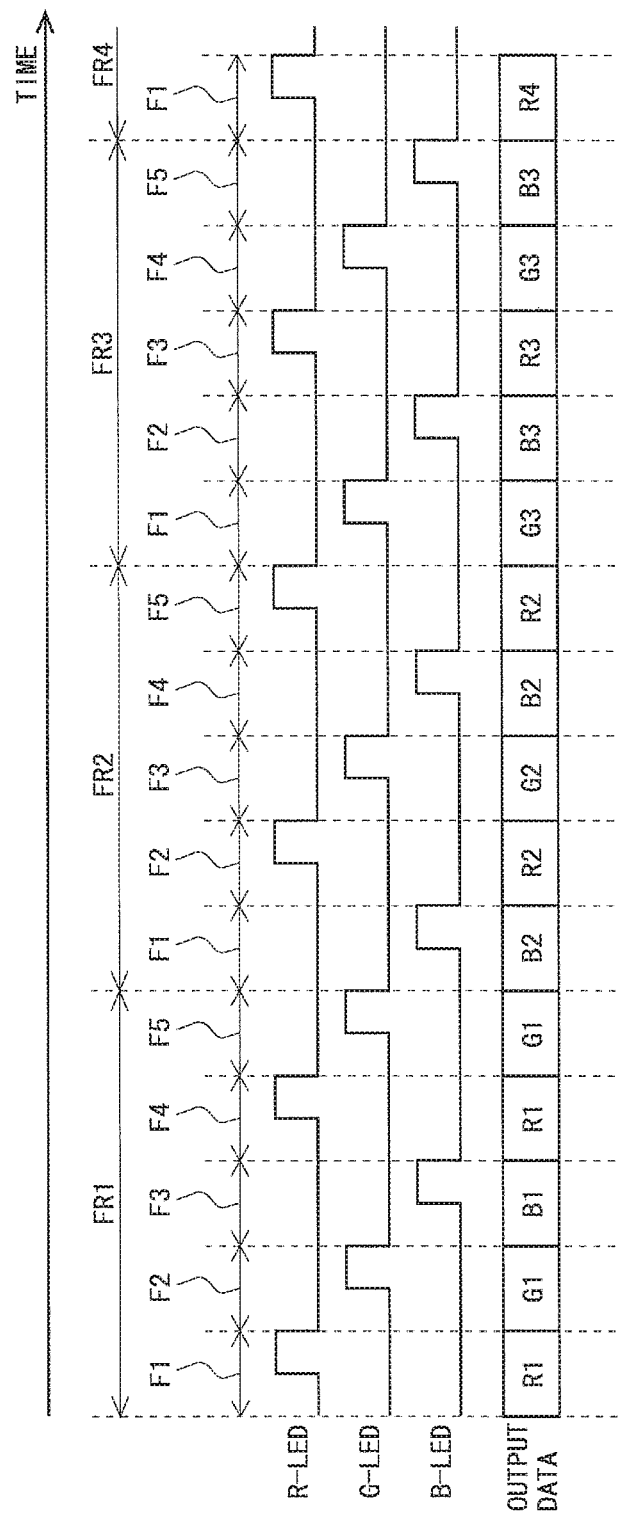
FIG. 36 is a diagram for describing a process performed by a high refresh rate circuit in the second embodiment.

Next, with reference to FIG. 36, a description will be given of specifically how the high refresh rate circuit 120 converts the input gradation data for each lighting pattern to the input gradation data for each field in the present embodiment. FIG. 36 is a diagram showing the relationship of the field, the lighting pattern, and the output data during given three frame periods. The high refresh rate circuit 120 receives, from the signal separation circuit 110, the red input gradation data, the green input gradation data, and the blue input gradation data which have been obtained from the input image signals DIN of the respective frames, and allocates these pieces of data as input gradation data for the respective fields as follows.

First Frame
  input gradation data D(1) for first field: red input gradation data R1
  input gradation data D(2) for second field: green input gradation data G1
  input gradation data D(3) for third field: blue input gradation data B1
  input gradation data D(4) for fourth field: red input gradation data R1
  input gradation data D(5) for fifth field: green input gradation data G1
Second Frame
  input gradation data D(1) for first field: blue input gradation data B2
  input gradation data D(2) for second field: red input gradation data R2
  input gradation data D(3) for third field: green input gradation data G2
  input gradation data D(4) for fourth field: blue input gradation data B2
  input gradation data D(5) for fifth field: red input gradation data R2
Third Frame
  input gradation data D(1) for first field: green input gradation data G3
  input gradation data D(2) for second field: blue input gradation data B3
  input gradation data D(3) for third field: red input gradation data R3
  input gradation data D(4) for fourth field: green input gradation data G3
  input gradation data D(5) for fifth field: blue input gradation data B3

Figure 37:
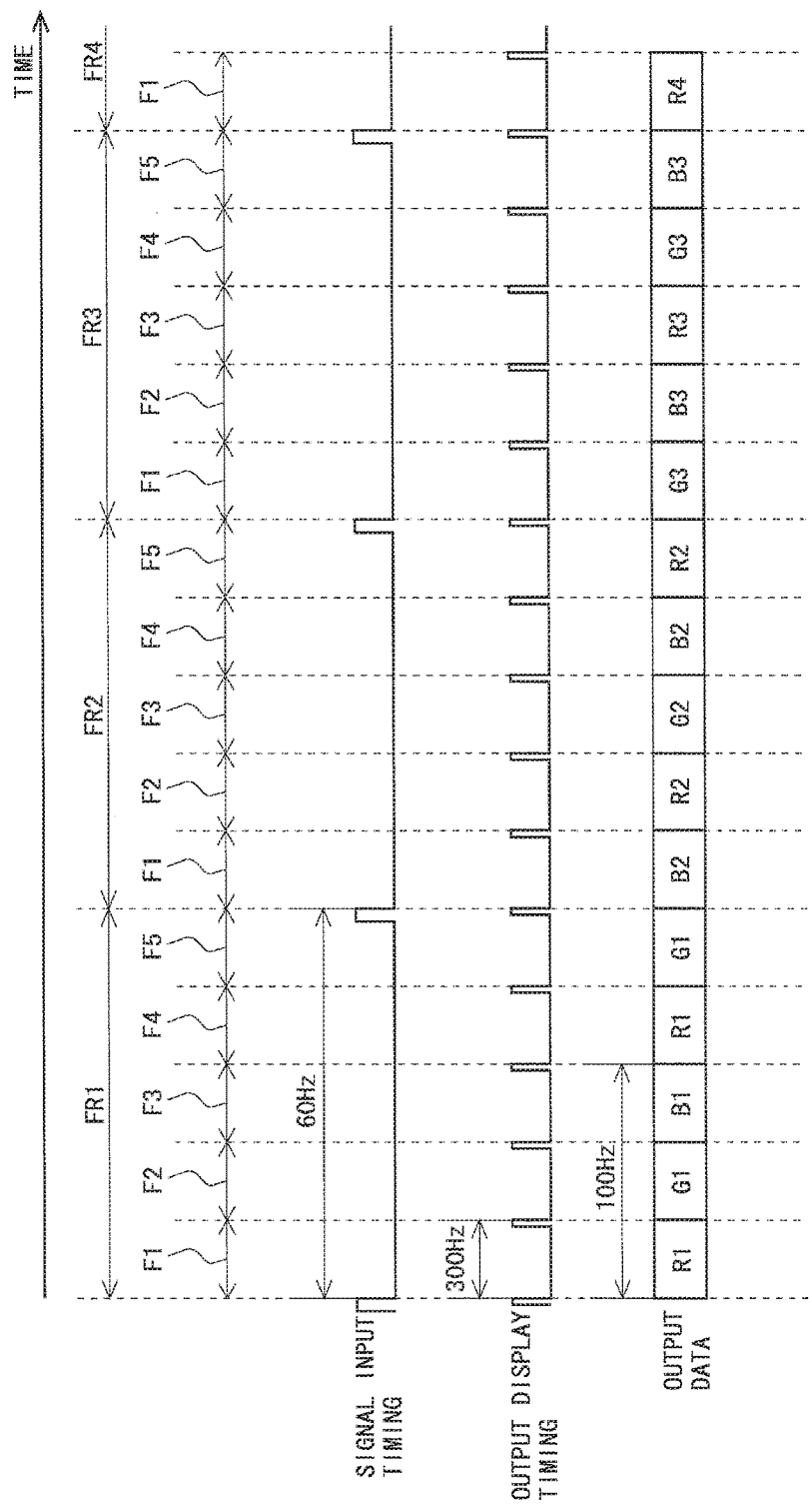
FIG. 37 is a diagram for describing the process performed by the high refresh rate circuit in the second embodiment.

In the present embodiment, the allocation of data as thus described is repeated taking three frames as a cycle. Here, since the frame frequency in the present embodiment is 60 Hz and one frame period is divided into five fields, the drive frequency of the overall light source is 300 Hz. While one frame period is divided into five fields, data is allocated as described above, and hence a screen of the same color (a screen of a color based on the same lighting pattern) is displayed every three fields. Accordingly, the frequency of the luminance change based on each lighting pattern is 100 Hz (see FIG. 37).

<2.4 Data Correction Circuit>

Figure 38:
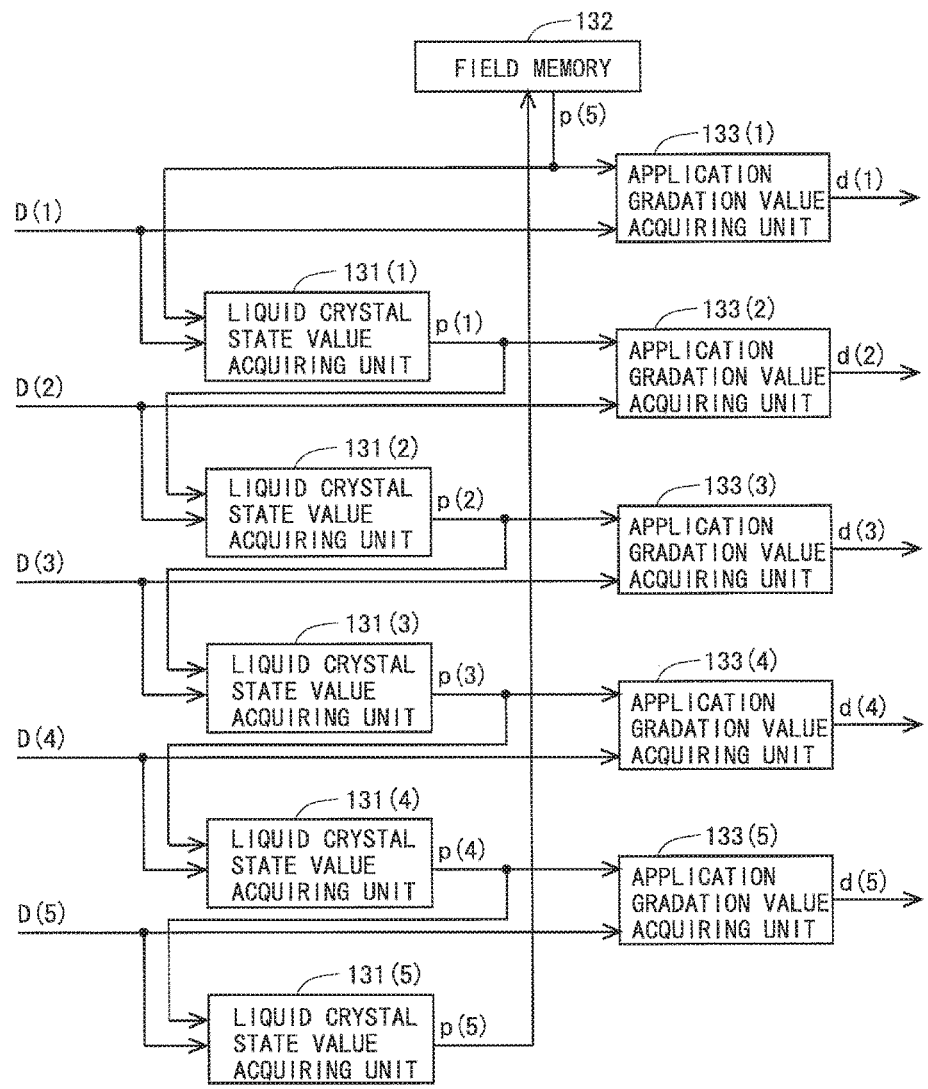
FIG. 38 is a block diagram showing a detailed configuration of a data correction circuit in the second embodiment.

FIG. 38 is a block diagram showing a detailed configuration of the data correction circuit 130 in the present embodiment. As understood from FIGS. 1 and 38, in the present embodiment, in addition to the constituents in the first embodiment, the data correction circuit 130 includes a liquid crystal state value acquiring unit 131(5) for the fifth field and an application gradation value acquiring unit 133(5) for the fifth field. In the data correction circuit 130, the same operation as in the first embodiment is performed except that a process for the fifth field is performed after the process for the fourth field has been performed. Thus, a detailed description of the data correction circuit 130 will be omitted.

<2.5 Effects>

According to the present embodiment, similarly to the first embodiment, in the liquid crystal display device employing the field sequential system, even when the liquid crystal state changes during the lighting period of the backlight 490, desired display luminance can be obtained in each field. Further, in the present embodiment, one frame period includes five fields. During the operation of the liquid crystal display device, the three lighting patterns repeatedly appear in predetermined order while the lighting pattern is switched in every field. Hence the frequency of the luminance change based on each lighting pattern is 100 Hz. That is, display at a refresh rate (update frequency) of 100 Hz is apparently performed. As a result, the occurrence of flicker is reliably prevented. Accordingly, there is realized the liquid crystal display device employing the field sequential system which is capable of reliably preventing the occurrence of flicker while preventing the occurrence of color shift.

<3. Third Embodiment>

<3.1 Summary>

Figure 39:
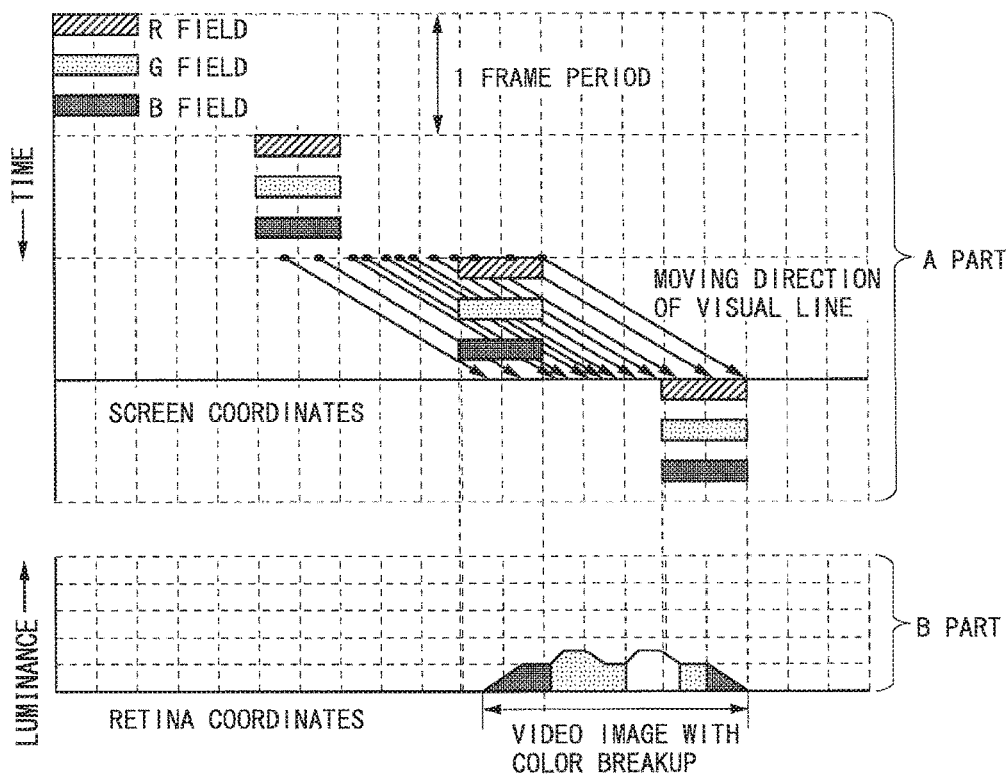
FIG. 39 is a diagram showing an occurrence principle of color breakup.

As for the liquid crystal display device employing the field sequential color system, there is conventionally known a problem of occurrence of color breakup. FIG. 39 is a diagram showing an occurrence principle of color breakup. In an A part of FIG. 39, a vertical axis represents time and a horizontal axis represents a position on the screen. In general, when an object moves within the display screen, the visual line of the observer follows the object and moves in a moving direction of the object. For example, in the example shown in FIG. 39, when a white object moves from left to right within the display screen, the visual line of the observer moves in a direction of oblique arrows. On the other hand, when three field images of R, G, and B are extracted from a video image at the same moment, the position of the object in each field image is the same. For this reason, as shown in a B part of FIG. 39, color breakup occurs in a video image reflected on the retina. As one of measures against such color breakup, there has been made a proposal for providing in one frame period a field that displays a color not being any of the three primary colors, that is, a field for performing display with at least two colors (mixed-color display). Specifically, by providing a white field that displays a white screen in one frame period, the occurrence of color breakup is effectively prevented. Accordingly, in the present embodiment, at least one white field is provided in each frame period.

In the present embodiment, as the lighting patterns, a fourth lighting pattern in which all the red LED, the green LED, and the blue LED are in the lighted state is prepared in addition to the first to third lighting patterns. A field set to this fourth lighting pattern is a white field. In each field, the backlight 490 is lighted in any of the first to fourth lighting patterns.

In the present embodiment, similarly to the second embodiment, one frame period includes five fields (first to fifth fields F1 to F5) (see FIG. 34). However, differently from the second embodiment, the lighting pattern that appears in each field repeatedly changes in each field in the order of "the fourth lighting pattern, the first lighting pattern, the second lighting pattern, and the third lighting pattern."

Accordingly, in the present embodiment, a white screen, a red screen, a green screen, and a blue screen are repeatedly displayed during the operation of the liquid crystal display device.

<3.2 Configuration>

Figure 40:
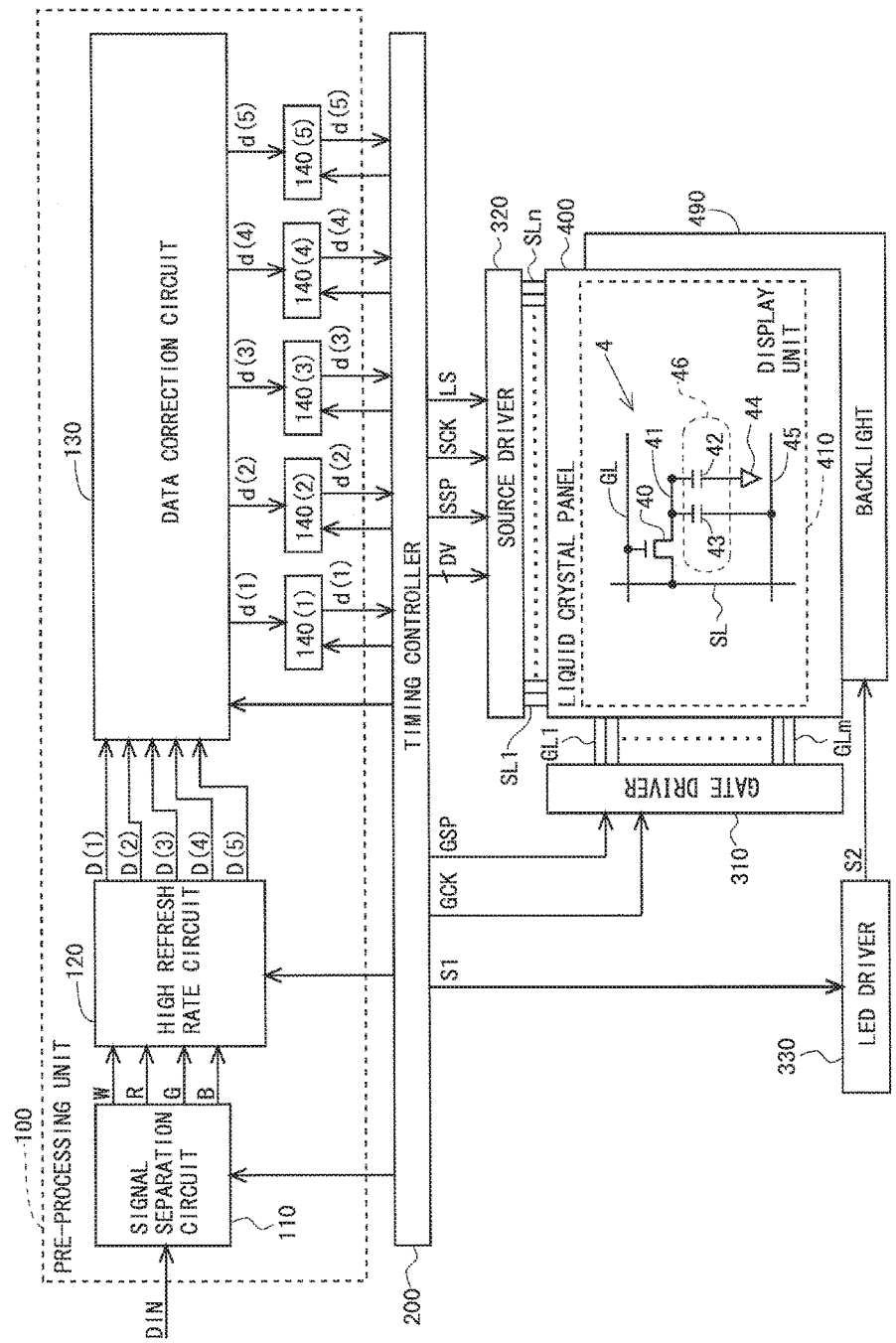
FIG. 40 is a block diagram showing an overall configuration of a liquid crystal display device according to a third embodiment of the present invention.

FIG. 40 is a block diagram showing an overall configuration of a liquid crystal display device according to the third embodiment of the present invention. In the present embodiment, the configuration of the pre-processing unit 100 is different from the configuration in the second embodiment (see FIG. 35). Specifically, the output data from the signal separation circuit 110 and the input data into the high refresh rate circuit 120 are different from those in the second embodiment. Hereinafter, only a different point from the second embodiment will be described. Note that a detailed configuration of the data correction circuit 130 is the configuration shown in FIG. 38 as in the second embodiment.

The signal separation circuit 110 in the pre-processing unit 100 separates the input image signal DIN transmitted from the outside into input gradation data for the fourth lighting pattern, input gradation data for the first lighting pattern, input gradation data for the second lighting pattern, and input gradation data for the third lighting pattern. Specifically, the signal separation circuit 110 in the pre-processing unit 100 separates the input image signal DIN transmitted from the outside into white input gradation data W, red input gradation data R, green input gradation data G, and blue input gradation data B.

The high refresh rate circuit 120 in the pre-processing unit 100 divides one frame period into five fields, and converts the input gradation data for each lighting pattern to the input gradation data for each field by allocating the input gradation data (white input gradation data W, red input gradation data R, green input gradation data G, blue input gradation data B) obtained by the signal separation circuit 110 to the five fields such that a cycle in which the same lighting pattern appears is shorter than a cycle in which the input image signal DIN for one frame period (for one screen) is inputted. With the four lighting patterns prepared, a process of allocating the four kinds of input gradation data to the five fields is performed. Thereby, input gradation data D(1) for the first field, input gradation data D(2) for the second field, input gradation data D(3) for the third field, input gradation data D(4) for the fourth field, and input gradation data D(5) for the fifth field are outputted from the high refresh rate circuit 120.

<3.3 High Refresh Rate Circuit>

Figure 41:
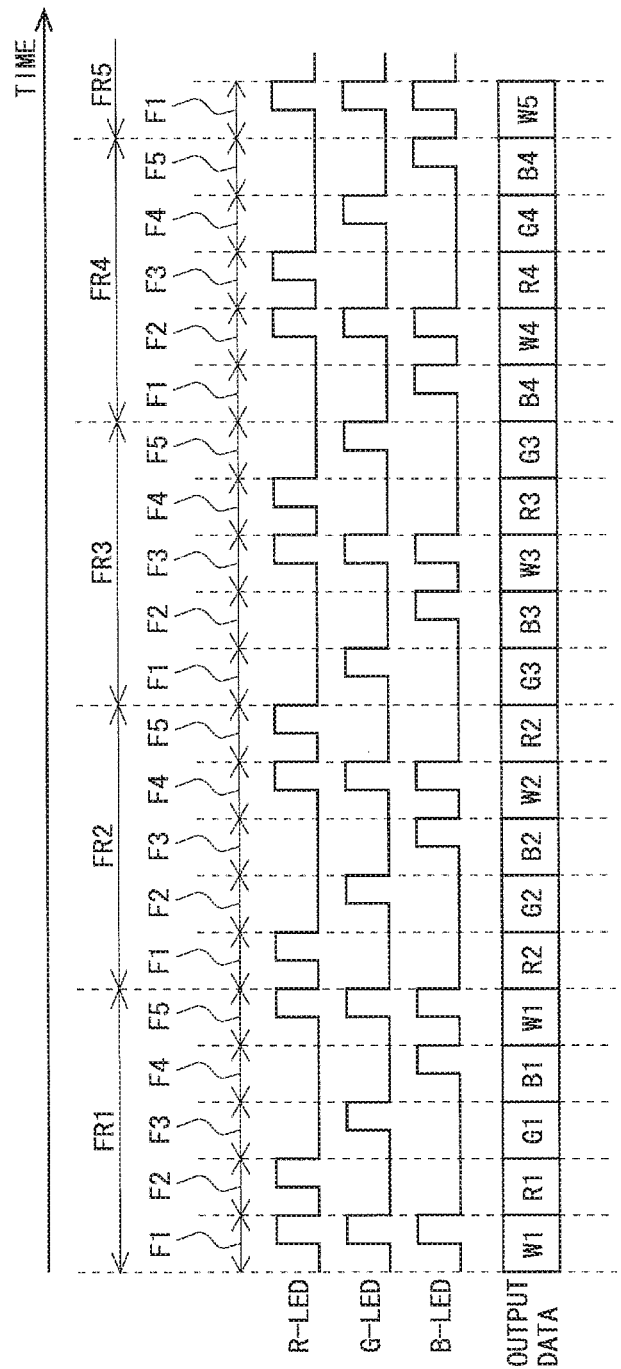
FIG. 41 is a diagram for describing a process performed by a high refresh rate circuit in the third embodiment.

Next, with reference to FIG. 41, a description will be given of specifically how the high refresh rate circuit 120 converts the input gradation data for each lighting pattern to the input gradation data for each field in the present embodiment. FIG. 41 is a diagram showing the relationship of the field, the lighting pattern, and the output data during given four frame periods. The high refresh rate circuit 120 receives, from the signal separation circuit 110, the white input gradation data, the red input gradation data, the green input gradation data, and the blue input gradation data which have been obtained from the input image signals DIN of the respective frames, and allocates these pieces of data as input gradation data for the respective fields as follows.

First Frame input gradation data D(1) for first field: white input gradation data W1 input gradation data D(2) for second field: red input gradation data R1 input gradation data D(3) for third field: green input gradation data G1 input gradation data D(4) for fourth field: blue input gradation data B1 input gradation data D(5) for fifth field: white input gradation data W1

Second Frame input gradation data D(1) for first field: red input gradation data R2 input gradation data D(2) for second field: green input gradation data G2 input gradation data D(3) for third field: blue input gradation data B2 input gradation data D(4) for fourth field: white input gradation data W2 input gradation data D(5) for fifth field: red input gradation data R2

Third Frame input gradation data D(1) for first field: green input gradation data G3 input gradation data D(2) for second field: blue input gradation data B3 input gradation data D(3) for third field: white input gradation data W3 input gradation data D(4) for fourth field: red input gradation data R3 input gradation data D(5) for fifth field: green input gradation data G3

Fourth Frame input gradation data D(1) for first field: blue input gradation data B4 input gradation data D(2) for second field: white input gradation data W4 input gradation data D(3) for third field: red input gradation data R4 input gradation data D(4) for fourth field: green input gradation data G4 input gradation data D(5) for fifth field: blue input gradation data B4

Figure 42:
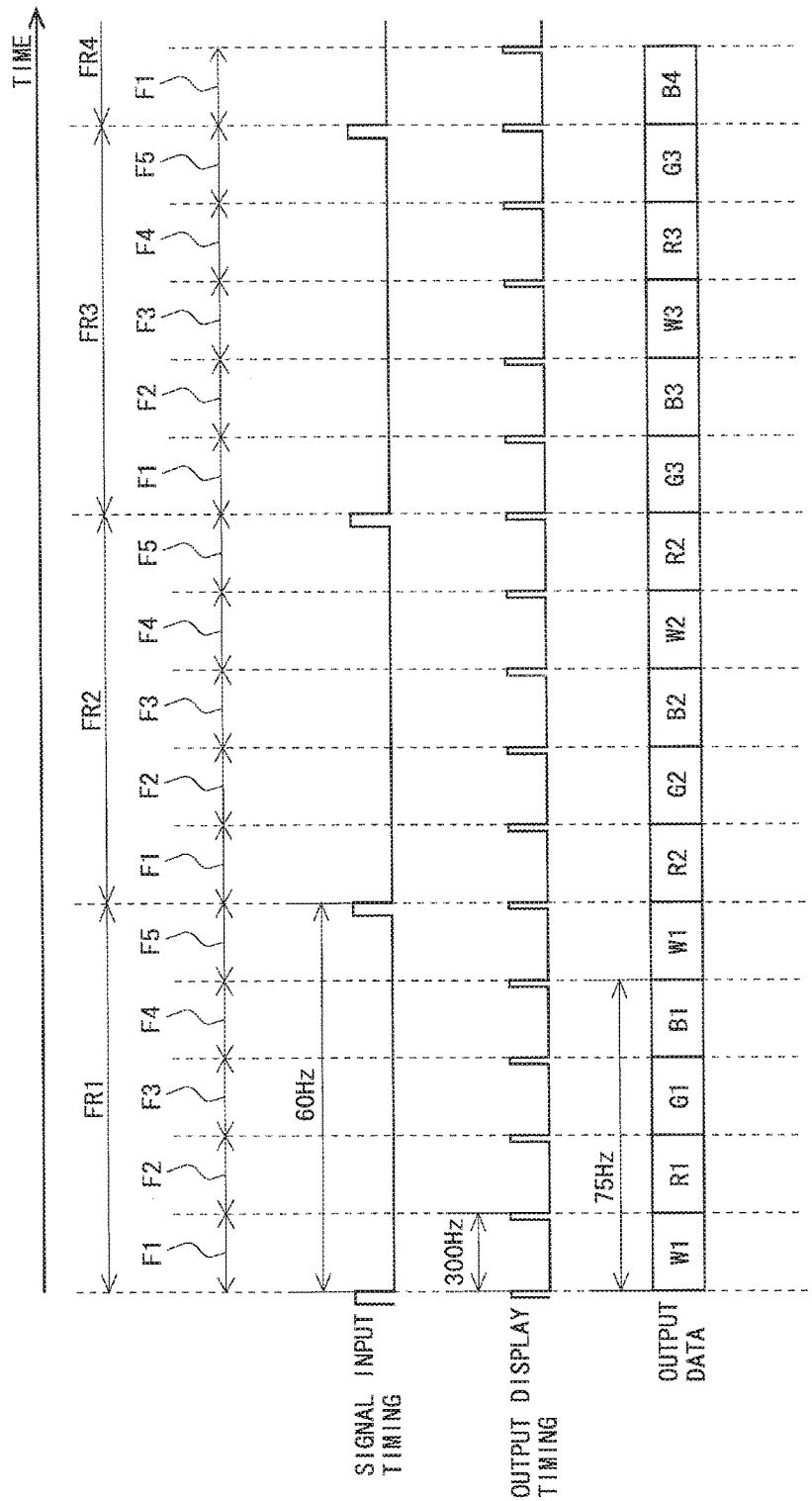
FIG. 42 is a diagram for describing the process performed by the high refresh rate circuit in the third embodiment.

In the present embodiment, the allocation of data as thus described is repeated taking four frames as a cycle. Here, since the frame frequency in the present embodiment is 60 Hz and one frame period is divided into five fields, the drive frequency of the overall light source is 300 Hz. While one frame period is divided into five fields, data is allocated as described above, and hence a screen of the same color (a screen of a color based on the same lighting pattern) is displayed every four fields. Accordingly, the frequency of the luminance change based on each lighting pattern is 75 Hz (see FIG. 42).

<3.4 Effects>

According to the present embodiment, similarly to the first embodiment, in the liquid crystal display device employing the field sequential system, even when the liquid crystal state changes during the lighting period of the backlight 490, desired display luminance can be obtained in each field. Further, in the present embodiment, at least one white field is provided in each frame period. That is, one frame period includes a field in which a mixed color component of the three primary colors is displayed. Accordingly, the occurrence of color breakup is prevented. Further, in the configuration in which four lighting patterns are prepared, one frame period is divided into five fields. During the operation of the liquid crystal display device, the four lighting patterns repeatedly appear in predetermined order while the lighting pattern is switched in every field. Accordingly, the occurrence of flicker is prevented. Thus, there is realized the liquid crystal display device employing the field sequential system which is capable of preventing the occurrence of color breakup, color shift, and flicker.

<4. Fourth Embodiment>

<4.1 Summary>

According to the third embodiment, the frequency of the luminance change based on each lighting pattern has been 75 Hz. However, even when the frequency of the luminance change is 75 Hz, some observers perceive flicker. Hence in the present embodiment, in the configuration in which four lighting patterns are prepared, one frame period is divided into six fields.

Figure 43:
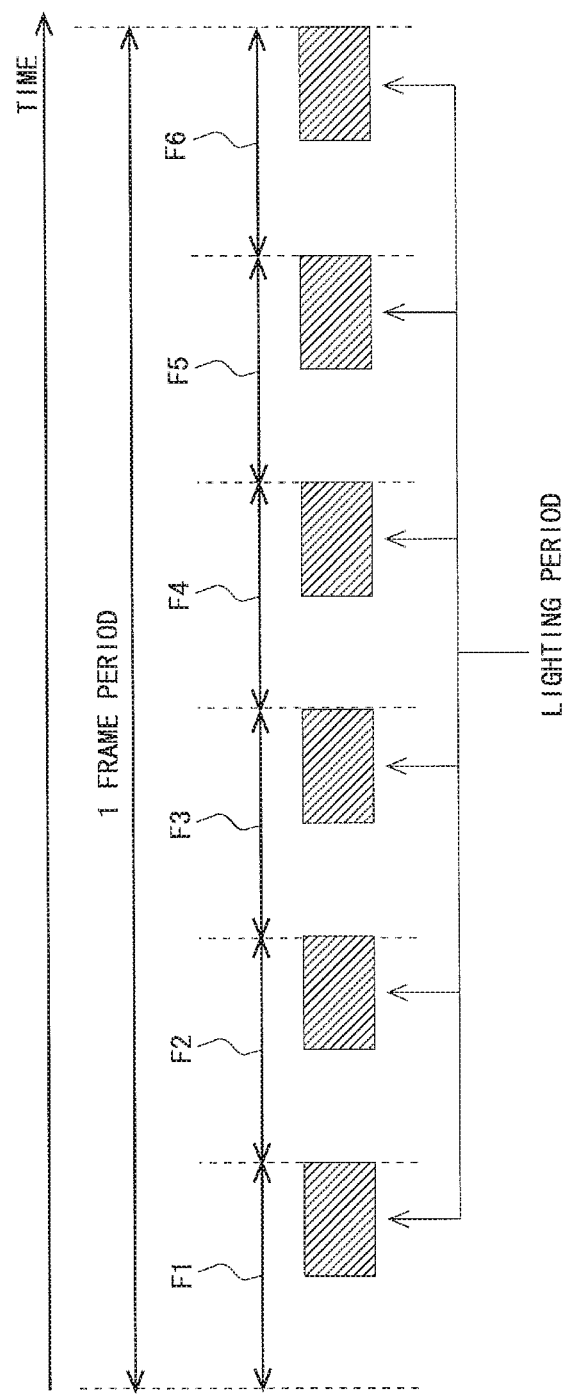
FIG. 43 is a diagram showing a configuration of one frame period in a fourth embodiment of the present invention.

FIG. 43 is a diagram showing a configuration of one frame period in the present embodiment. As shown in FIG. 43, one frame period includes six fields (first to sixth fields F1 to F6). The lighting pattern that appears in each field repeatedly changes in the order of "the fourth lighting pattern, the first lighting pattern, the second lighting pattern, and the third lighting pattern." In each field, after the lapse of a predetermined period from the field start time, the backlight 490 is lighted depending on the lighting pattern.

<4.2 Configuration>

Figure 44:
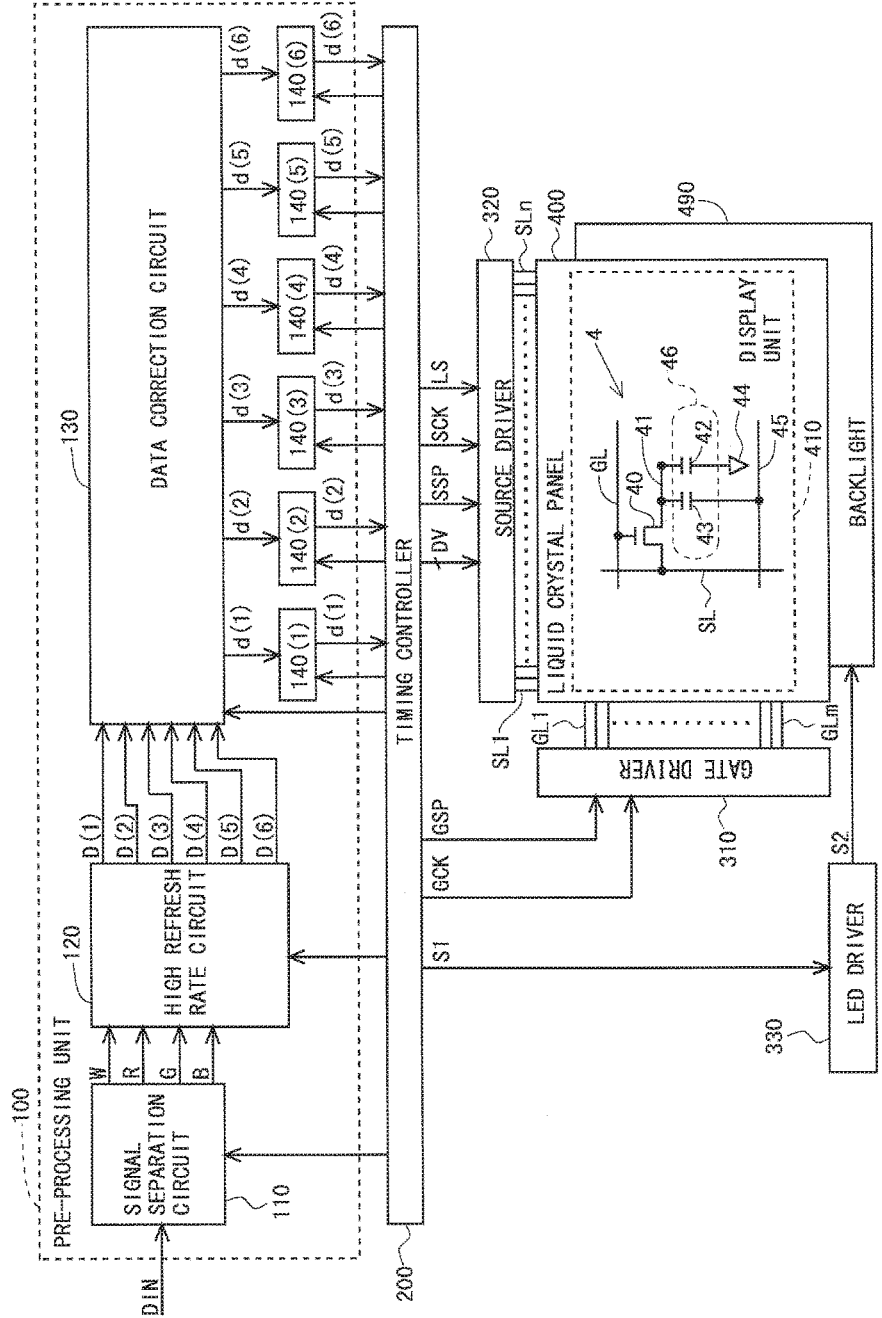
FIG. 44 is a block diagram showing an overall configuration of a liquid crystal display device according to the fourth embodiment.

FIG. 44 is a block diagram showing an overall configuration of a liquid crystal display device according to the fourth embodiment of the present invention. In the present embodiment, the configuration of the pre-processing unit 100 is different from the configuration in the third embodiment (see FIG. 40). In the pre-processing unit 100 of the present embodiment, a sixth field memory 140(6) is provided in addition to the constituents in the third embodiment. Hereinafter, only a different point from the third embodiment will be described.

The high refresh rate circuit 120 in the pre-processing unit 100 divides one frame period into six fields, and converts the input gradation data for each lighting pattern to the input gradation data for each field by allocating the input gradation data (white input gradation data W, red input gradation data R, green input gradation data G, blue input gradation data B) obtained by the signal separation circuit 110 to the sixth fields such that a cycle in which the same lighting pattern appears is shorter than a cycle in which the input image signal DIN for one frame period (for one screen) is inputted. With the four lighting patterns prepared, a process of allocating the four kinds of input gradation data to the six fields is performed. Thereby, input gradation data D(1) for the first field, input gradation data D(2) for the second field, input gradation data D(3) for the third field, input gradation data D(4) for the fourth field, input gradation data D(5) for the fifth field, and input gradation data D(6) for the sixth field are outputted from the high refresh rate circuit 120.

The data correction circuit 130 in the pre-processing unit 100 corrects the input gradation data (the input gradation data D(1) to D(6) for the first to sixth fields) outputted from the high refresh rate circuit 120 to data associated with a voltage to be applied to the liquid crystal panel 400. The data correction circuit 130 then outputs the data after correction as application gradation data (application gradation data d(1) to d(6) for the first to sixth fields).

In the first to sixth field memories 140(1) to (6), the application gradation data d(1) to d(6) for the first to sixth fields outputted from the data correction circuit 130 are stored respectively.

<4.3 High Refresh Rate Circuit>

Figure 45:
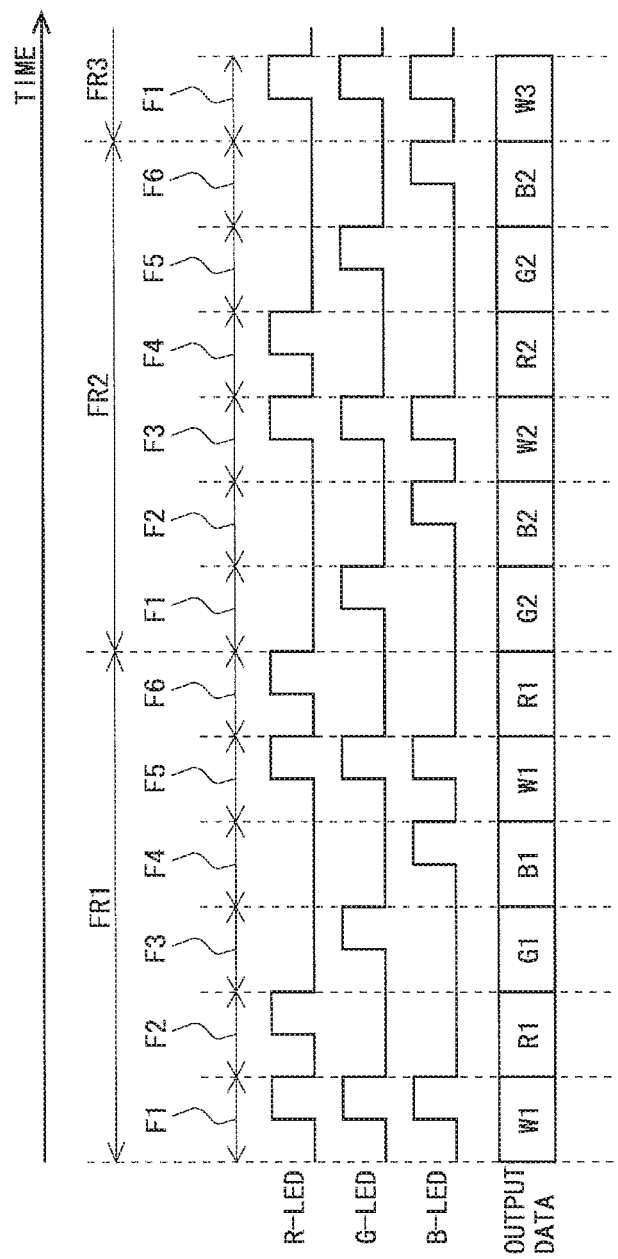
FIG. 45 is a diagram for describing a process performed by a high refresh rate circuit in the fourth embodiment.

Next, with reference to FIG. 45, a description will be given of specifically how the high refresh rate circuit 120 converts the input gradation data for each lighting pattern to the input gradation data for each field in the present embodiment. FIG. 45 is a diagram showing the relationship of the field, the lighting pattern, and the output data during given two frame periods. The high refresh rate circuit 120 receives, from the signal separation circuit 110, the white input gradation data, the red input gradation data, the green input gradation data, and the blue input gradation data which have been obtained from the input image signals DIN of the respective frames, and allocates these pieces of data as input gradation data for the respective fields as follows.

First Frame
  input gradation data D(1) for first field: white input gradation data W1
  input gradation data D(2) for second field: red input gradation data R1
  input gradation data D(3) for third field: green input gradation data G1
  input gradation data D(4) for fourth field: blue input gradation data B1
  input gradation data D(5) for fifth field: white input gradation data W1
  input gradation data D(6) for sixth field: red input gradation data R1
Second Frame
  input gradation data D(1) for first field: green input gradation data G2
  input gradation data D(2) for second field: blue input gradation data B2
  input gradation data D(3) for third field: white input gradation data W2
  input gradation data D(4) for fourth field: red input gradation data R2
  input gradation data D(5) for fifth field: green input gradation data G2
  input gradation data D(6) for sixth field: blue input gradation data B2

Figure 46:
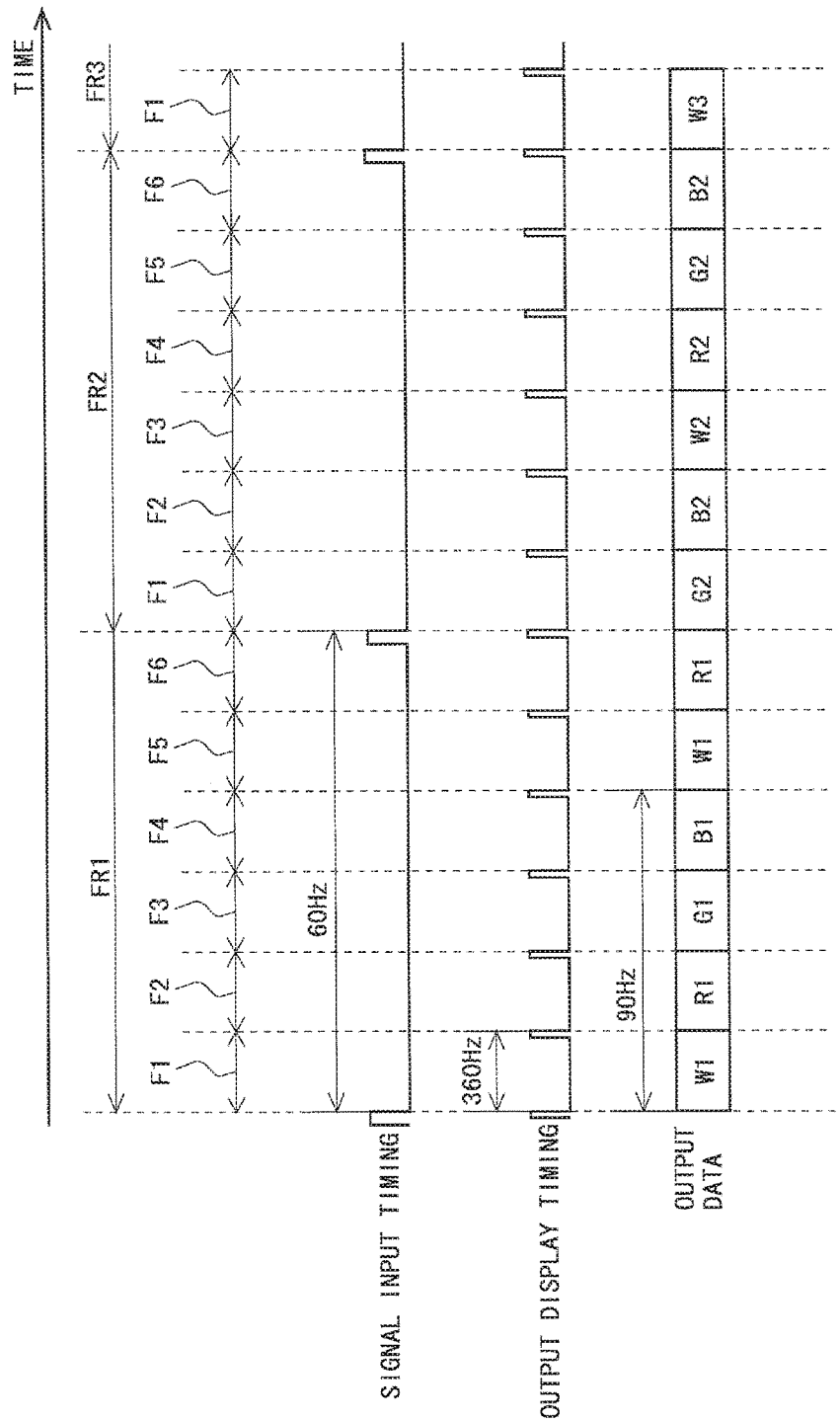
FIG. 46 is a diagram for describing the process performed by the high refresh rate circuit in the fourth embodiment.

In the present embodiment, the allocation of data as thus described is repeated taking two frames as a cycle. Here, since a frame frequency in the present embodiment is 60 Hz and one frame period is divided into six fields, a drive frequency of the overall light source is 360 Hz. While one frame period is divided into six fields, data is allocated as described above, and hence a screen of the same color (a screen of a color based on the same lighting pattern) is displayed every four fields. Accordingly, the frequency of the luminance change based on each lighting pattern is 90 Hz (see FIG. 46).

<4.4 Data Correction Circuit>

Figure 47:
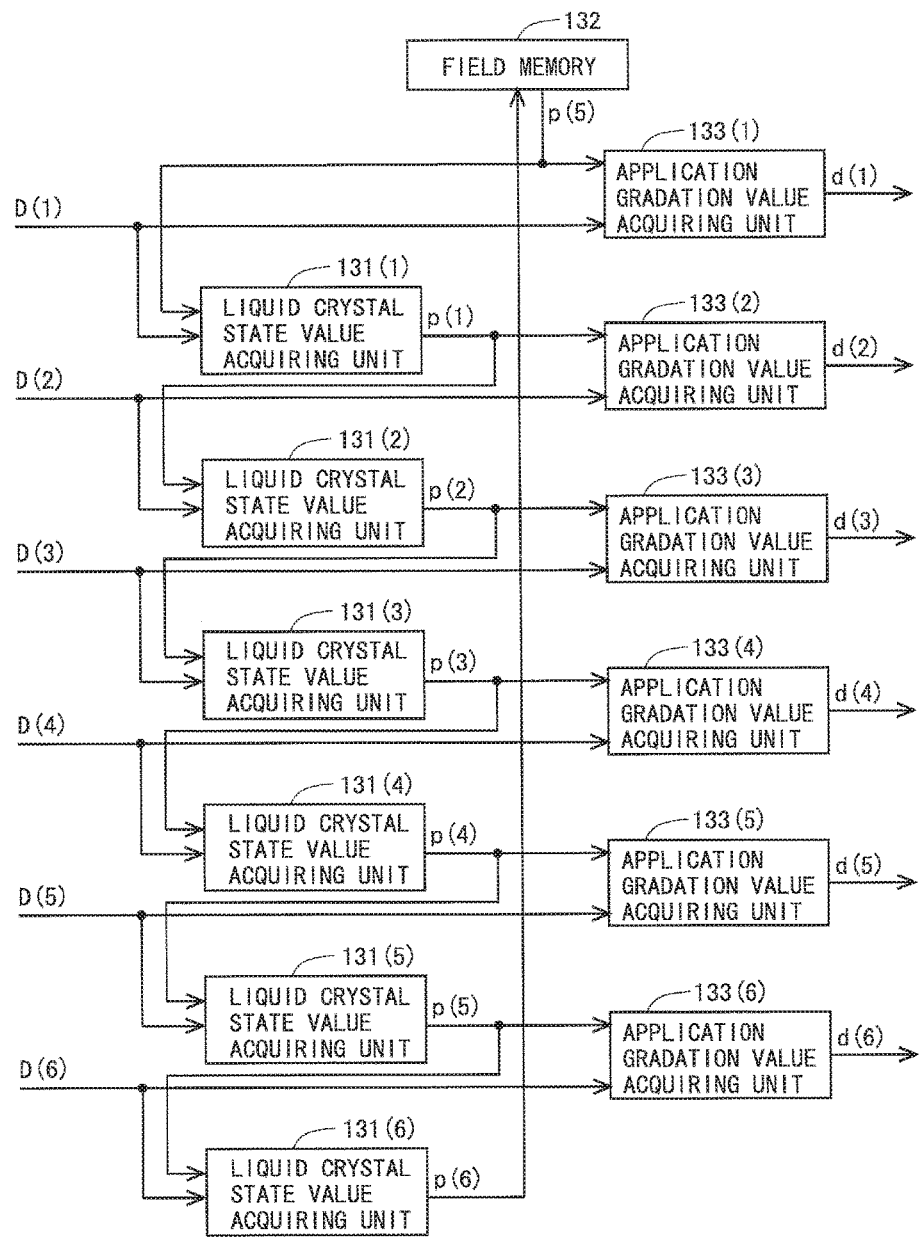
FIG. 47 is a block diagram showing a detailed configuration of a data correction circuit in the fourth embodiment.
Figure 48:
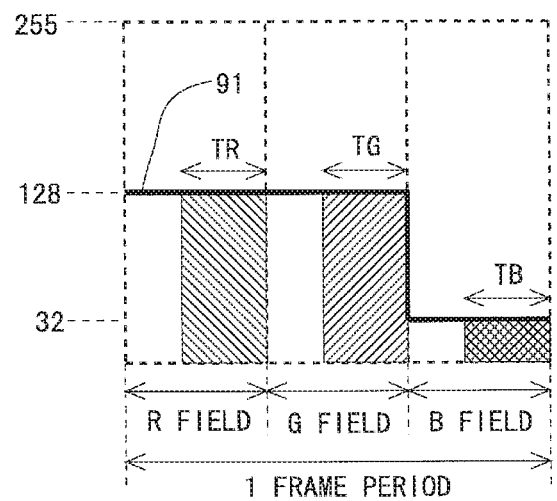
FIG. 48 is a waveform diagram showing one example of a change in liquid crystal state when response characteristics of liquid crystal molecules are ideal.
Figure 49:
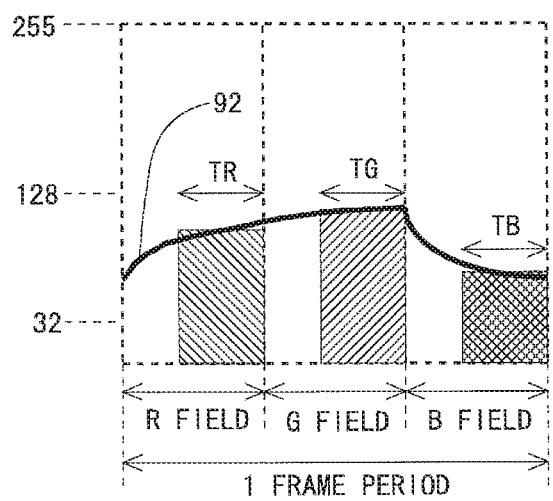
FIG. 49 is a waveform diagram showing one example of the change in liquid crystal state when overdrive is not adopted.
Figure 50:
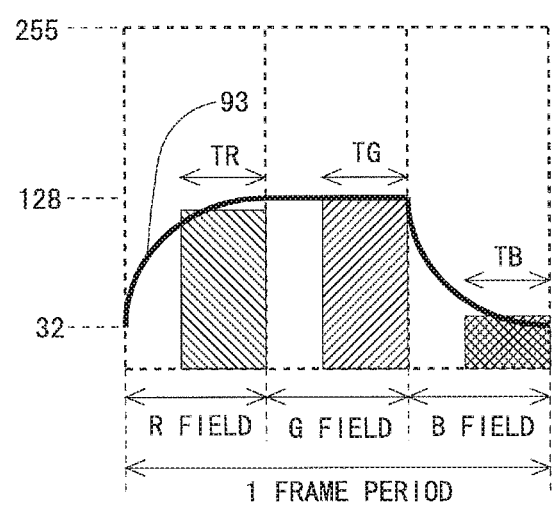
FIG. 50 is a waveform diagram showing one example of the change in liquid crystal state when overdrive is adopted.

FIG. 47 is a block diagram showing a detailed configuration of the data correction circuit 130 in the present embodiment. As understood from FIGS. 38 and 47, in the present embodiment, in addition to the constituents in the second embodiment, the data correction circuit 130 includes a liquid crystal state value acquiring unit 131(6) for the sixth field and an application gradation value acquiring unit 133(6) for the sixth field (the configuration of the data correction circuit is the same between the second embodiment and the third embodiment). In the data correction circuit 130, the same operation as in the second embodiment is performed except that a process for the sixth field is performed after the process for the fifth field has been performed.

<4.5 Effects>

According to the present embodiment, similarly to the third embodiment, at least one white field is provided in each frame period, thereby preventing the occurrence of color breakup. Further, in the present embodiment, one frame period has been divided into six fields. During the operation of the liquid crystal display device, the four lighting patterns repeatedly appear in predetermined order while the lighting pattern is switched in every field. Hence the frequency of the luminance change based on each lighting pattern is 90 Hz. That is, display at a refresh rate (update frequency) of 90 Hz is apparently performed. As a result, the occurrence of flicker is reliably prevented. Accordingly, there is realized the liquid crystal display device employing the field sequential system which is capable of reliably preventing the occurrence of flicker while preventing the occurrence of color breakup and color shift.

<5. Others>

The present invention is not limited to each of the above embodiments, and various modifications can be made as long as not deviating from the scope of the invention. For example, one frame period may be divided into fields, the number of which is greater than the number of fields described in each of the above embodiments. Further, as the configuration for preventing the occurrence of color breakup, there may be prepared a lighting pattern in which light sources of two colors out of the three primary colors are in the lighted state.

<6. Notes>

As a method of calculating parameters of the conversion tables (the application gradation value acquiring look-up table 1330 and the liquid crystal state value acquiring look-up table 1310) used in the present invention, configurations described below are considered.

(Note 1)

A method of calculating application gradation data which is data corresponding to a voltage to be applied to a liquid crystal panel in a current field, based on input gradation data for the current field and liquid crystal state data which is data corresponding to an expected attainment gradation for the end time of a field one field before the current field, in a liquid crystal display device employing a field sequential system including the liquid crystal panel configured to display an image and a backlight configured to irradiate the liquid crystal panel with light, the method including:

a first luminance value measuring step of measuring a luminance value at the time of putting the backlight in a lighted state only for a predetermined period in a state where a voltage corresponding to the input gradation value is applied to the liquid crystal panel;

a second luminance value measuring step of measuring luminance values corresponding to respective gradation values at the time of applying voltages corresponding to the variety of gradation values to the liquid crystal panel from a state where a voltage corresponding to the liquid crystal state data has been applied to the liquid crystal panel, and putting the backlight in the lighted state only for a predetermined period; and an application gradation data determining step of selecting the closest luminance value to the luminance value obtained by the first luminance value measuring step out of the luminance values obtained by the second luminance value measuring step, and taking the gradation value having obtained the selected luminance value at the time of the measurement in the second gradation value measuring step as a value of the application gradation data.

(Note 2)

A method of calculating liquid crystal state data, the method calculating second liquid crystal state data which is data corresponding to an expected attainment gradation for an end time of a current field, based on input gradation data for the current field and first liquid crystal state data which is data corresponding to an expected attainment gradation for the end time of a field one field before the current field, in a liquid crystal display device employing a field sequential system including the liquid crystal panel configured to display an image and a backlight configured to irradiate the liquid crystal panel with light, the method including:

a first luminance value measuring step of measuring a luminance value corresponding to each gradation value at the time of putting the backlight in a lighted state only for a predetermined period in a state where a voltage corresponding to each gradation value is applied to the liquid crystal panel;

a second luminance value measuring step of measuring luminance values corresponding to respective gradation values at the time of applying voltages corresponding to the variety of gradation values to the liquid crystal panel and putting the backlight in the lighted state only for a predetermined period, after a voltage corresponding to the input gradation data has been applied to the liquid crystal panel from a state where a voltage corresponding to the first liquid crystal state data has been applied to the liquid crystal panel; and a second liquid crystal state data determining step of taking, as a value of the second liquid crystal state data, a gradation value, out of the gradation values used in the first luminance value measuring step and the second luminance value measuring step, with which the luminance value obtained by the first luminance value measuring step and the luminance value obtained by the second luminance value measuring step become values closest to each other.

DESCRIPTION OF REFERENCE CHARACTERS

100: PRE-PROCESSING UNIT
110: SIGNAL SEPARATION CIRCUIT
120: HIGH REFRESH RATE CIRCUIT
130: DATA CORRECTION CIRCUIT
131, 131(1) to 131(6): LIQUID CRYSTAL STATE VALUE ACQUIRING UNIT
132: FIELD MEMORY
133, 133(1) to 133(6): APPLICATION GRADATION VALUE ACQUIRING UNIT
140(1) to 140(6): FIRST TO SIXTH FIELD MEMORIES
200: TIMING CONTROLLER
310: GATE DRIVER
320: SOURCE DRIVER
330: LED DRIVER
400: LIQUID CRYSTAL PANEL
410: DISPLAY UNIT
490: BACKLIGHT
1310: LIQUID CRYSTAL STATE VALUE ACQUIRING LOOK-UP TABLE
1330: APPLICATION GRADATION VALUE ACQUIRING LOOK-UP TABLE

The invention claimed is:

1. A liquid crystal display device employing a field sequential system, the liquid crystal display device including a liquid crystal panel that displays an image and a backlight including light sources of a plurality of colors that illuminates the liquid crystal panel with light, and performing color display by switching a lighting pattern for each field, the lighting pattern representing a combination of a lighted state and an unlighted state of the light sources of the plurality of colors in each field, the liquid crystal device comprising:

input image data separating circuitry that separates input image data into input gradation data for each lighting pattern;

high refresh rate processing circuitry that divides one frame period into a plurality of fields, a number of which is greater than a number of lighting patterns, and convert the input gradation data for each lighting pattern to input gradation data for each field by allocating the input gradation data obtained by the input image data separating circuitry to the plurality of fields such that a cycle in which the same lighting pattern appears is shorter than a cycle in which input image data for one frame period is inputted, data correcting circuitry that obtains liquid crystal state data that is data corresponding to an expected attainment gradation for an end time of each field, and obtain application gradation data that is data corresponding to a voltage to be applied to the liquid crystal panel by correcting the input gradation data for each field obtained by the high refresh rate processing circuitry;

liquid crystal panel driving circuitry that drives the liquid crystal panel based on the application gradation data; and backlight driving circuitry that drives the backlight such that the liquid crystal panel is illuminated with light of a color corresponding to the lighting pattern in each field, wherein the data correcting unit includes
    liquid crystal state data acquiring circuitry that obtains liquid crystal state data for a current field based on input gradation data for the current field and liquid crystal state data for a field one field before the current field, and
    application gradation data acquiring circuitry that obtains application gradation data for the current field by correcting the input gradation data for the current field based on the liquid crystal state data for the field one field before the current field, and the application gradation data acquiring circuitry obtains the application gradation data for the current field such that display luminance in each field becomes display luminance corresponding to the input gradation data obtained by the high refresh rate processing circuitry.

2. The liquid crystal display device according to claim 1, wherein the data correcting circuitry further includes a field memory capable of holding data for one field, one frame period is divided into P (P is an integer not less than four) fields, liquid crystal state data for a Pth field is held in the field memory, the liquid crystal state data acquiring circuitry for a first field obtains liquid crystal state data for the first field of the current frame based on input gradation data for the first field of the current frame and the liquid crystal state data for the Pth field of a previous frame, that is held in the field memory, the application gradation data acquiring circuitry for the first field obtains application gradation data for the first field of the current frame by correcting the input gradation data for the first field of the current frame based on the liquid crystal state data for the Pth field of the previous frame, that is held in the field memory, the liquid crystal state data acquiring circuitry for a Qth (Q is an integer not less than two and not greater than P) field obtains liquid crystal state data for the Qth field of the current frame based on input gradation data for the Qth field of the current frame and liquid crystal state data for a (Q−1)th field of the current frame, and the application gradation data acquiring circuitry for the Qth field obtains application gradation data for the Qth field of the current frame by correcting the input gradation data for the Qth field of the current frame based on the liquid crystal state data for the (Q−1)th field of the current frame.

3. The liquid crystal display device according to claim 1, wherein the high refresh rate processing circuitry converts the input gradation data for each lighting pattern to the input gradation data for each field such that prepared lighting patterns repeatedly appear in predetermined order, while the lighting pattern is switched in every field.

4. The liquid crystal display device according to claim 1, wherein
the liquid crystal state data acquiring circuitry
includes a liquid crystal state data acquiring look-up table that stores a value associated with input gradation data for the current field, a value associated with liquid crystal state data for the field one field before the current field, and a value corresponding to a combination of the value associated with the input gradation data for the current field and the value associated with the liquid crystal state data for the field one field before the current field, and
obtains liquid crystal state data for the current field based on the liquid crystal state data acquiring look-up table, and
the application gradation data acquiring circuitry
includes an application gradation data acquiring look-up table that stores a value associated with input gradation data for the current field, a value associated with liquid crystal state data for the field one field before the current field, and a value corresponding to a combination of the value associated with the input gradation data for the current field and the value associated with the liquid crystal state data for the field one field before the current field, and
obtains application gradation data for the current field based on the application gradation data acquiring look-up table.

5. The liquid crystal display device according to claim 1, wherein
the light sources of the plurality of colors include a red light source, a green light source, and a blue light source, and
a first lighting pattern, a second lighting pattern, and a third lighting pattern are prepared as lighting patterns, the first lighting pattern putting only the red light source in the lighted state, the second lighting pattern putting only the green light source in the lighted state, the third lighting pattern putting only the blue light source in the lighted state.

6. The liquid crystal display device according to claim 5, wherein the high refresh rate processing circuitry divides one frame period into four fields.

7. The liquid crystal display device according to claim 5, wherein the high refresh rate processing circuitry divides one frame period into five fields.

8. The liquid crystal display device according to claim 1, wherein
the light sources of the plurality of colors include a red light source, a green light source, and a blue light source, and
a first lighting pattern, a second lighting pattern, a third lighting pattern, and a fourth lighting pattern are prepared as lighting patterns, the first lighting pattern putting only the red light source in the lighted state, the second lighting pattern putting only the green light source in the lighted state, the third lighting pattern putting only the blue light source in the lighted state, the fourth lighting pattern putting the red light source, the green light source, and the blue light source in the lighted state.

9. The liquid crystal display device according to claim 8, wherein the high refresh rate processing circuitry divides one frame period into five fields.

10. The liquid crystal display device according to claim 8, wherein the high refresh rate processing circuitry divides one frame period into six fields.

11. The liquid crystal display device according to claim 1, wherein the liquid crystal panel includes
pixel electrodes arranged in a matrix form,
a common electrode disposed so as to face the pixel electrodes,
liquid crystal held between the pixel electrodes and the common electrode,
scanning signal lines,
video signal lines, to which video signals in accordance with the application gradation data are applied,
thin film transistors each including a control terminal connected to one of the scanning signal lines, a first conductive terminal connected to one of the video signal lines, a second conductive terminal connected to one of the pixel electrodes, and a channel layer made of an oxide semiconductor.

12. The liquid crystal display device according to claim 11 wherein the oxide semiconductor includes indium, gallium, zinc, and oxygen as main components.

13. A method of driving a liquid crystal display device employing a field sequential system, the liquid crystal display device including a liquid crystal panel that displays an image and a backlight including light sources of a plurality of colors that illuminates the liquid crystal panel with light, and performing color display by switching a lighting pattern for each field, the light pattern representing a combination of a lighted state and an unlighted state of the light sources of the plurality of colors in each field, the method comprising:
an input image data separating step of separating input image data into input gradation data for each lighting pattern;
a high refresh rate processing step of dividing one frame period into a plurality of fields, a number of which is greater than a number of lighting patterns, and converting the input gradation data for each lighting pattern to input gradation data for each field by allocating the input gradation data obtained by the input image data separating step to the plurality of fields such that a cycle in which a same lighting pattern appears is shorter than a cycle in which input image data for one frame period is inputted;
a data correcting step of obtaining liquid crystal state data that is data corresponding to an expected attainment gradation for an end time of each field, and obtaining application gradation data that is data corresponding to a voltage to be applied to the liquid crystal panel by correcting the input gradation data for each field obtained by the high refresh rate processing step;
a liquid crystal panel driving step of driving the liquid crystal panel based on the application gradation data; and
a backlight driving step of driving the backlight such that the liquid crystal panel is illuminated with light of a color corresponding to the lighting pattern in each field, wherein the data correcting step includes:
- a liquid crystal state data acquiring step of obtaining liquid crystal state data for a current field based on input gradation data for the current field and liquid crystal state data for a field one field before the current field, and
- an application gradation data acquiring step of obtaining application gradation data for the current field by correcting input gradation data for the current field based on liquid crystal state data for the field one field before the current field, and in the application gradation data acquiring step, the application gradation data for the current field is obtained such that display luminance in each field becomes display luminance corresponding to the input gradation data obtained by the high refresh rate processing step.

* * * * *